(12) United States Patent
Tsukao et al.

(10) Patent No.: US 12,365,772 B2
(45) Date of Patent: Jul. 22, 2025

(54) FILLER-CONTAINING FILM

(71) Applicant: DEXERIALS CORPORATION, Tokyo (JP)

(72) Inventors: Reiji Tsukao, Utsunomiya (JP); Takeshi Miyake, Koyama (JP)

(73) Assignee: DEXERIALS CORPORATION, Tokyo (JP)

( * ) Notice: Subject to any disclaimer, the term of this patent is extended or adjusted under 35 U.S.C. 154(b) by 490 days.

(21) Appl. No.: 16/333,200

(22) PCT Filed: Aug. 31, 2017

(86) PCT No.: PCT/JP2017/031318
§ 371 (c)(1),
(2) Date: Mar. 13, 2019

(87) PCT Pub. No.: WO2018/051799
PCT Pub. Date: Mar. 22, 2018

(65) Prior Publication Data
US 2019/0241710 A1   Aug. 8, 2019

(30) Foreign Application Priority Data

Sep. 13, 2016  (JP) ................................ 2016-179042
Apr. 23, 2017  (JP) ................................ 2017-084913
(Continued)

(51) Int. Cl.
*C08J 5/18*         (2006.01)
*B32B 27/08*      (2006.01)
(Continued)

(52) U.S. Cl.
CPC ................. *C08J 5/18* (2013.01); *B32B 27/08* (2013.01); *C09J 9/02* (2013.01); *C09J 11/04* (2013.01);
(Continued)

(58) Field of Classification Search
CPC . C08J 5/18; B32B 27/08; B32B 27/20; B32B 2250/02; B32B 2250/24;
(Continued)

(56) References Cited

U.S. PATENT DOCUMENTS

| | | | | |
|---|---|---|---|---|
| 2014/0312501 A1* | 10/2014 | Liang | ..................... | B32B 27/38 |
| | | | | 257/773 |
| 2015/0231803 A1* | 8/2015 | Shinohara | ............... | H01L 24/29 |
| | | | | 264/496 |
| 2015/0240130 A1* | 8/2015 | Liang | ........................ | C09J 7/20 |
| | | | | 428/206 |

FOREIGN PATENT DOCUMENTS

| | | |
|---|---|---|
| CN | 104541416 A | 4/2015 |
| JP | H07308632 A | 11/1995 |
| | (Continued) | |

OTHER PUBLICATIONS

English translation of JP-2000149677-A, Kanota et al. (Year: 2000).*

(Continued)

*Primary Examiner* — Nathan L Van Sell
(74) *Attorney, Agent, or Firm* — Oliff PLC

(57) ABSTRACT

In a filler-containing film in which fillers are dispersed in a resin layer, a flow of the fillers caused by an unnecessary flow of the resin layer is suppressed during the pressure bonding of the filler-containing film and an article. This filler-containing film (10A) includes a filler-dispersed layer (3) in which fillers (1) are dispersed in a resin layer (2). The surface in the vicinity of the fillers (1) of the resin layer (2) has concavities (2b) and (2c) with respect to the tangent plane to the central portion of the surface of the resin layer (2) between adjacent fillers (1). The ratio (La/D) of a layer thickness La of the resin layer (2) to a particle diameter D of the filler (1) is preferably from 0.6 to 10.

33 Claims, 15 Drawing Sheets

(30) Foreign Application Priority Data

Aug. 20, 2017 (JP) ................................. 2017-158302
Aug. 30, 2017 (JP) ................................. 2017-166277

(51) Int. Cl.
| | |
|---|---|
| *C09J 9/02* | (2006.01) |
| *C09J 11/04* | (2006.01) |
| *C09J 11/06* | (2006.01) |
| *C09J 201/00* | (2006.01) |
| *H01R 4/04* | (2006.01) |
| *H01R 11/01* | (2006.01) |

(52) U.S. Cl.
CPC ............. *C09J 11/06* (2013.01); *C09J 201/00* (2013.01); *H01R 11/01* (2013.01); *C08L 2203/16* (2013.01); *H01R 4/04* (2013.01)

(58) Field of Classification Search
CPC . B32B 2255/10; B32B 27/281; B32B 27/308; B32B 27/38; B32B 2255/26; B32B 2264/0207; B32B 2264/0235; B32B 27/40; B32B 2264/025; B32B 2264/102; B32B 2264/105; B32B 27/26; B32B 27/32; B32B 27/34; B32B 27/36; B32B 2264/107; B32B 2307/202; B32B 2307/206; B32B 2307/30; B32B 2307/538; B32B 2307/706; B32B 2405/00; B32B 2457/00; B32B 7/027; C09J 9/02; C09J 11/04; C09J 11/06; C09J 201/00; C09J 2400/22; C09J 7/30; C09J 2203/326; C09J 2301/314; C09J 2301/408; C09J 2433/00; C09J 7/10; H01R 11/01; H01R 4/04; C08L 2203/16; C08K 2201/001
See application file for complete search history.

(56) References Cited

FOREIGN PATENT DOCUMENTS

| | | |
|---|---|---|
| JP | 2002348547 A | 12/2002 |
| JP | 2003-064324 A | 3/2003 |
| JP | 2004207689 A | 7/2004 |
| JP | 200615680 A | 1/2006 |
| JP | 2013103368 A | 5/2013 |
| JP | 2014-060150 A | 4/2014 |
| JP | 2014-060151 A | 4/2014 |
| JP | 2014132567 A | 7/2014 |
| JP | 2014183266 A | 9/2014 |
| JP | 2015138904 A | 7/2015 |
| JP | 2015195198 A | 11/2015 |
| JP | 2016-085983 A | 5/2016 |
| JP | 201685982 A | 5/2016 |
| JP | 2016-103476 A | 6/2016 |
| KR | 10-2011-0137158 A | 12/2011 |

OTHER PUBLICATIONS

Sep. 14, 2021 Notice of Reasons for Refusal issued in Japanese Patent Application No. 2017-166277.
Jun. 29, 2020 Office Action issued in Korean Patent Application No. 10-2018-7036915.
Dec. 21, 2021 Office Action issued in Chinese Patent Application No. 201780052909.3.
Mar. 21, 2019 Notification of Transmittal of Translation of the International Preliminary Report on Patentability issued in International Application No. PCT/JP2017/031318.
Feb. 7, 2021 Office Action issued in Chinese Patent Application No. 201780052909.3.
Feb. 25, 2021 Office Action issued in Taiwanese Patent Application No. 106130309.
Apr. 14, 2021 Office Action issued in Korean Patent Application No. 10-2018-7036915.
Dec. 5, 2017 International Search Report issued in International Patent Application PCT/JP2017/031318.
Dec. 5, 2017 Written Opinion issued in International Patent Application PCT/JP2017/031318.
Sep. 4, 2018 Written Opinion of the International Preliminary Examining Authority issued in International Patent Application PCT/JP2017/031318.
Jul. 1, 2022 Office Action issued in Korean Patent Application No. 10-2022-7018479.
Jun. 29, 2022 Office Action issued in Chinese Patent Application No. 201780052909.3.
Feb. 28, 2022 Office Action issued in Korean Patent Application No. 10-2018-7036915.
Sep. 27, 2023 Office Action issued in Korean Patent Application No. 10-2018-7036915.
Mar. 6, 2024 Office Action issued in Chinese Patent Application No. 1202211291848.5.
Apr. 8, 2024 Office Action issued in Korean Patent Application No. 10-2022-7018479.
Jan. 10, 2025 Office Action issued in Chinese Patent Application No. 202211291848.5.

* cited by examiner

FIG. 14

Table 2A

| | Example 1 | Example 2 | Example 3 | Example 4 | Example 5 | Example 6 |
|---|---|---|---|---|---|---|
| Particle position | [diagram] | [diagram] | [diagram] | [diagram] | [diagram] | [diagram] |
| Presence or absence of concavities 2b and 2c | Concavities 2b were present | Concavities 2b were present | Concavities 2b were present | Concavities 2b were present | Concavities 2b were present | Concavities 2b were present |
| Conductive particle diameter: D (μm) | 3 | 3 | 3 | 3 | 3 | 3 |
| Embedding percentage: 100 × Lh/D (%) | 63 | 87 | 100 | 100 | 103 | 103 |
| Exposed diameter of particle: Le (μm) | 3 | 3 | 3 | 2.2 | 2.3 | 2.4 |
| Embedded amount: Lb (μm) | 1.9 | 2.6 | 3 | 3.0 | 3.1 | 3.1 |
| Film minimum thickness at position with presence of conductive particle: Lg (μm) | 2.1 | 1.4 | 1.0 | 1.0 | 0.9 | 14.9 |
| Thickness (μm) | Tack layer | - | - | - | - | - | - |
| | Insulating resin layer (La) | 4 | 4 | 4 | 4 | 4 | 18 |
| | Second insulating resin layer | 14 | 14 | 14 | 14 | 14 | - |

FIG. 14 (continued)

| | | | | | | | | |
|---|---|---|---|---|---|---|---|---|
| | La/D | 1.3 | 1.3 | 1.3 | 1.3 | 1.3 | 1.3 | 6 |
| Minimum melt viscosity (Pa·s) | Tack layer | - | - | - | - | - | - | - |
| | Insulating resin layer | 6000 | 6000 | 6000 | 6000 | 6000 | 6000 | 3000 |
| | Second insulating resin layer | 800 | 800 | 800 | 800 | 800 | 800 | - |
| | Insulating resin layer/second insulating resin layer | 8 | 8 | 8 | 8 | 8 | 8 | - |
| Viscosity at 60°C (Pa·s) | Insulating resin layer | 8000 | 8000 | 8000 | 8000 | 8000 | 8000 | 4500 |
| Conduction property (Ω) | Initial conduction resistance | 0.2 | 0.2 | 0.2 | 0.2 | 0.2 | 0.2 | 0.2 |
| | Conduction reliability 500 hrs | 2.5 | 2.2 | 2.2 | 2.4 | 2.3 | 2.4 | |
| Particle capturing performance | | B | A | A | A | A | B | |
| Displacement | | B | A | A | A | A | B | |

FIG. 14 (continued)

| | Example 7 | Example 8 | Example 9 | Example 10 |
|---|---|---|---|---|
| Particle position | [Glass substrate] | [Glass substrate] | [Glass substrate] | [Glass substrate] |
| Presence or absence of concavities 2b and 2c | Concavities 2b were present | Conductive particles were completely embedded in insulating resin layer Concavities 2c were present | Concavities 2b were present | Concavities 2b were present |
| Conductive particle diameter: D (μm) | 3 | 3 | 3 | 3 |
| Embedding percentage: 100 × Lb/D (%) | 103 | 105 | 103 | 103 |
| Exposed diameter of particle: Lc (μm) | 2.4 | 0 | 2.4 | 2.4 |
| Embedded amount: Lb (μm) | 3.1 | 3.2 | 3.1 | 3.1 |
| Film minimum thickness at position with presence of conductive particle: Lg (μm) | 14.9 | 14.8 | 14.9 | 14.9 |
| Thickness (μm) Tack layer | - | - | - | - |
| Insulating resin layer (La) | 18 | 18 | 30 | 30 |
| Second insulating resin layer | - | - | - | - |

FIG. 14 (continued)

| | | 6 | 6 | 10 | 10 |
|---|---|---|---|---|---|
| Minimum melt viscosity (Pa·s) | La/D | | | | |
| | Tack layer | | | | |
| | Insulating resin layer | 3000 | 3000 | 3000 | 3000 |
| | Second insulating resin layer | - | - | - | - |
| | Insulating resin layer/second insulating resin layer | - | - | - | - |
| Viscosity at 60°C (Pa·s) | Insulating resin layer | 4500 | 4500 | 4500 | 4500 |
| Conduction property (Ω) | Initial conduction resistance | 0.2 | 0.2 | 0.2 | 0.2 |
| | Conduction reliability 500 hrs | 2.4 | 2.3 | 2.8 | 2.7 |
| Particle capturing performance | | B | B | B | B |
| Displacement | | B | B | B | B |

FIG. 15

Table 2B

| | | Example 11 | Example 12 | Example 13 | Example 14 |
|---|---|---|---|---|---|
| Particle position | | [1 c] [Glass substrate] | [1 c] [Glass substrate] | [1 c] [Glass substrate] | [Glass substrate] |
| Presence or absence of concavities 2b and 2c | | Concavities 2b were present | Concavities 2b were present | Concavities 2b were present | Concavities 2b were present |
| Conductive particle diameter: D (μm) | | 3 | 3 | 3 | 3 |
| Embedding percentage: 100 × Lb/D (%) | | 103 | 100 | 43 | 103 |
| Exposed diameter of particle: Lc (μm) | | 3 | 3 | 2.6 | 2.3 |
| Embedded amount: Lb (μm) | | 3.1 | 3.0 | 1.3 | 3.1 |
| Film minimum thickness at position with presence of conductive particle: Lg (μm) | | 1.0 | 1.0 | 2.7 | 14.9 |
| Thickness (μm) | Tack layer | - | - | - | - |
| | Insulating resin layer (La) | 4 | 4 | 4 | 36 |
| | Second insulating resin layer | 14 | 14 | 14 | - |
| | La/D | 1.3 | 1.3 | 1.3 | 12 |
| Minimum melt viscosity (Pa·s) | Tack layer | - | - | - | - |
| | Insulating resin layer | 2000 | 1000 | 6000 | 3000 |
| | Second insulating resin layer | 800 | 800 | 800 | - |
| | Insulating resin layer/second insulating resin layer | 3 | 13 | 8 | - |

FIG. 15 (continued)

| Viscosity at 60°C (Pa·s) | Insulating resin layer | 3000 | 15000 | 8000 | 4500 |
|---|---|---|---|---|---|
| Conduction property (Ω) | Initial conduction resistance | 0.2 | 0.2 | 0.2 | 0.4 |
| | Conduction reliability 500 hrs | 2.5 | 2.5 | 2.5 | 4.9 |
| Particle capturing performance | | B | A | B | B |
| Displacement | | B | A | C | C |

FIG. 15 (continued)

| | Example 15 | Comparative Example 1 | Comparative Example 2 | Comparative Example 3 |
|---|---|---|---|---|
| Particle position | 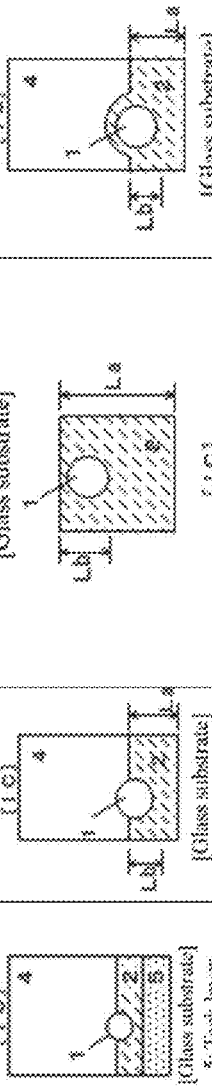 | 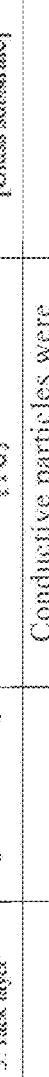 | 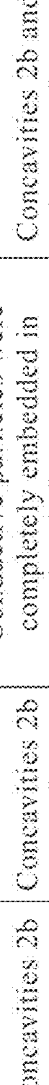 | 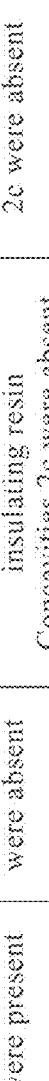 |
| Presence or absence of concavities 2b and 2c | Concavities 2b were present | Concavities 2b were absent | Conductive particles were completely embedded in insulating resin Concavities 2c were absent | Concavities 2b and 2c were absent |
| Conductive particle diameter: D (μm) | 3 | 3 | 3 | 3 |
| Embedding percentage: 100 × Lb/D (%) | 60 | 64 | >100 | 75 |
| Exposed diameter of particle: Lc (μm) | 2.6 | 2.5 | 0 | 0 |
| Embedded amount: Lb (μm) | 1.8 | 1.9 | >3.0 | 2.2 |
| Film minimum thickness at position with presence of conductive particle: Lg (μm) | 1.2 | 1.8 | 14.8 | 2.3 |
| Thickness (μm) — Tack layer | 3 | - | - | - |
| Thickness (μm) — Insulating resin layer (La) | 3 | 4 | 18 | 4 |
| Thickness (μm) — Second insulating resin layer | 12 | 14 | - | 14 |
| Thickness (μm) — La/D | 1 | 1.3 | 6 | 1.3 |
| Minimum melt viscosity (Pa·s) — Tack layer | 1000 | - | - | - |
| Minimum melt viscosity (Pa·s) — Insulating resin layer | 6000 | 1000 | 1000 | 6000 |
| Minimum melt viscosity (Pa·s) — Second insulating resin layer | 800 | 800 | - | 800 |
| Insulating resin layer/second insulating resin layer | 8 | 1 | - | 8 |

FIG. 15 (continued)

| Viscosity at 60°C (Pa·s) | Insulating resin layer | 8000 | 1500 | 1500 | 8000 |
|---|---|---|---|---|---|
| Conduction property (Ω) | Initial conduction resistance | 0.2 | 0.2 | 0.2 | 0.3 |
| | Conduction reliability 500 hrs | 2.8 | 2.4 | 2.5 | 6.4 |
| Particle capturing performance | | B | C | C | C |
| Displacement | | C | D | D | - |

FILLER-CONTAINING FILM

TECHNICAL FIELD

The present invention relates to a filler-containing film.

BACKGROUND ART

Filler-containing films, in which fillers are dispersed in a resin layer, have been used in various purposes, such as matte films, films for capacitors, optical films, films for labels, antistatic films, and anisotropic conductive films (Patent Documents 1 to 4). When a filler-containing film is pressure-bonded to an article which serves as an adherend for the filler-containing film, it is desirable to suppress uneven distribution of fillers by suppressing an unnecessary resin flow of a resin constituting the filler-containing film, from the perspectives of optical characteristics, mechanical characteristics, or electrical characteristics. In particular, in the case where a filler-containing film in which conductive particles are contained as fillers is used as an anisotropic conductive film used for mounting an electronic component, such as an IC chip, if the conductive particles are dispersed in a highly dense manner in an insulating resin layer so as to correspond to a high density mounting of the electronic component, the conductive particles dispersed in the highly dense manner inadvertently transfer and are unevenly distributed between terminals due to the resin flow during the mounting of the electronic component, and thus become a cause of a short circuit.

Meanwhile, an anisotropic conductive film in which a photocurable resin layer in which conductive particles are embedded as a single layer and an insulating adhesive layer are laminated has been proposed to improve workability during the temporary pressure bonding of the anisotropic conductive film to a substrate, as well as to reduce a short circuit (Patent Document 5). As the method of using this anisotropic conductive film, temporary pressure bonding is performed in a condition where an uncured photocurable resin has tackiness, then conductive particles are fixed by photocuring the photocurable resin layer, and then a substrate and an electronic component are subjected to final pressure bonding.

Furthermore, to achieve an object similar to that of Patent Document 5, an anisotropic conductive film having a three-layered structure has been also proposed, in which a first connection layer is sandwiched between a second connection layer and a third connection layer that are each formed mainly of an insulating resin (Patent Documents 6 and 7). Specifically, the anisotropic conductive film of Patent Document 6 has a first connection layer having a structure in which conductive particles are arranged in a single layer in a plane direction of an insulating resin layer on a side of the second connection layer, and the thickness of the insulating resin layer in central regions between adjacent conductive particles is smaller than the thickness of the insulating resin layer in regions in the vicinity of the conductive particles. Meanwhile, the anisotropic conductive film of Patent Document 7 has a structure in which the boundary between a first connection layer and a third connection layer is undulated and includes the first connection layer having a structure in which conductive particles are arranged in a single layer in a plane direction on a side of the third connection layer of an insulating resin layer; and the thickness of the insulating resin layer in central regions between adjacent conductive particles is smaller than the thickness of the insulating resin layer in regions in the vicinity of the conductive particles.

CITATION LIST

Patent Literature

Patent Document 1: JP 2006-15680 A
Patent Document 2: JP 2015-138904 A
Patent Document 3: JP 2013-103368 A
Patent Document 4: JP 2014-183266 A
Patent Document 5: JP 2003-064324 A
Patent Document 6: JP 2014-060150 A
Patent Document 7: JP 2014-060151 A

SUMMARY OF INVENTION

Technical Problem

However, the anisotropic conductive film described in Patent Document 5 causes problems in that, because the conductive particles easily move during the temporary pressure bonding of an anisotropically conductive connection, the precise disposition of the conductive particles before the anisotropically conductive connection cannot be maintained after the anisotropically conductive connection, or sufficient distances between the conductive particles cannot be ensured. Furthermore, when a photocured resin layer, in which conductive particles are embedded, and an electronic component are adhered to each other after the temporary bonding of such an anisotropic conductive film with a substrate and then the photocuring of a photocurable resin layer are performed, problems occur in that it is difficult to capture the conductive particles at edges of bumps of an electronic component, and problems also occur in that conductive particles cannot be sufficiently pushed into because such pushing of the conductive particles requires excessively large force. Furthermore, in Patent Document 5, to improve the pushing of the conductive particles, sufficient study was not conducted from the perspectives such as the exposure of conductive particles from the photocurable resin layer.

Therefore, it is conceivable to improve workability when an anisotropic conductive film and an electronic component are adhered while suppressing flow characteristics of the conductive particles during the anisotropic ally conductive connection by dispersing the conductive particles in an insulating resin layer, which exhibits high viscosity at heating temperature at the time of the anisotropically conductive connection, not in a photocurable resin layer. However, even if the conductive particles are precisely disposed on such an insulating resin layer, when the resin layer flows during the anisotropically conductive connection, the conductive particles also flow at the same time. Therefore, it is difficult to attempt sufficient improvement of the conductive particle capturing performance and reduction in short circuiting, and it is also difficult for the conductive particles after the anisotropically conductive connection to maintain the initial precise disposition and to maintain the condition where the conductive particles are separated one another.

Furthermore, in the case of the anisotropic conductive films having a three-layered structure described in Patent Documents 6 and 7, although problems are not observed for basic anisotropically conductive connection characteristics, reduction in the number of production steps has been demanded due to its three-layered structure from the perspective of production cost. Furthermore, the entirety or a part of the first connection layer is significantly protruded along the outer shape of the conductive particles in the vicinity of the conductive particles on one face of the first connection layer; the insulating resin layer constituting the first connection layer is not flat; and the conductive particles are retained in the protruded part. Therefore, it is anticipated that the number of restrictions on design for improving the retention of the conductive particles and capturing performance by terminals is increased.

On the other hand, in the filler-containing film in which the fillers such as conductive particles are dispersed in the resin layer, an object of the present invention is to suppress the flow of fillers caused by an unnecessary flow of a resin layer during the pressure bonding of a filler-containing film to an article, especially in the case where the filler-containing film is configured to be an anisotropic conductive film, to suppress an unnecessary flow of the conductive particles during the thermocompression bonding of the anisotropic conductive film and an electronic component, to improve the conductive particle capturing performance at terminals, and to reduce short circuiting, without a need for a three-layered structure and even when the entirety or a part of the resin layer is not protruded due to the outer shape of the filler in the vicinity of the filler of the resin which retains the filler.

Solution to Problem

In the filler-containing film having a filler-dispersed layer where the fillers such as conductive particles are dispersed in the resin layer, regarding the relationship between the viscosity of a resin layer and the surface shape of the resin layer in the vicinity of a filler, the inventors of the present invention found the following. That is, of the anisotropic conductive film described in Patent Document 5, while the surface on the side, in which the conductive particles are embedded, of the insulating resin layer (i.e. photocurable resin layer) itself is flat, the inventors of the present invention found that (i) when a surface of a resin layer around a filler, such as conductive particles, is concaved with respect to a tangent plane to a central portion of the resin layer surface between adjacent fillers in the case where the filler is exposed from the resin layer, a part of the surface of the resin layer is absent due to the concavity, and thus unnecessary insulating resin, which may impair the bonding of the filler to an article, can be reduced when the filler-containing film is bonded to the article by pressure-bonding the filler-containing film to the article, (ii) when a wavy undulation which is recognized as a trace of embedding of the filler into the resin layer is formed on the surface of the resin layer directly above the filler in the case where the filler is not exposed from the resin layer and is embedded in the resin layer, the filler is readily pushed into by the article when the filler-containing film is pressure-bonded to the article due to the less amount of the resin at the concavity portion of the undulation, and (iii) thus, when two articles that are facing each other are pressure-bonded through the filler-containing film, the filler held between the facing articles and the articles are suitably connected, that is, the filler capturing performance for the article or the consistency of arrangement conditions of the filler held between the articles before and after the pressure bonding is improved, and the product inspection of the filler-containing film and the checking of a useable surface are facilitated. In addition, it was also found that, in the case where a filler-dispersed layer is formed by pushing the filler into the resin layer, such a concavity in the resin layer can be formed by adjusting the viscosity of the resin layer into which the filler is pushed.

The present invention is based on the findings described above and provides a filler-containing film including a filler-dispersed layer having fillers dispersed in a resin layer, a surface of the resin layer in the vicinity of the filler having a concavity with respect to a tangent plane to a central portion of the resin layer surface between adjacent fillers. In particular, the present invention provides a film in which, regarding this concavity, the surface of the resin layer around the filler is absent with respect to the tangent plane, or a resin amount of the resin layer directly above the filler is less than a resin amount in the case where the surface of the resin layer directly above the filler is at the tangent plane.

Furthermore, the present invention provides a method of producing a filler-containing film, the method including a step of forming a filler-dispersed layer in which fillers are dispersed in a resin layer, wherein the step of forming a filler-dispersed layer includes a step of allowing the fillers to be retained on a surface of the resin layer, and a step of pushing the fillers retained on the surface of the resin layer into the resin layer;

in the step of allowing the fillers to be retained on a surface of the resin layer, the fillers are retained on the surface of the resin layer under a condition that the fillers are dispersed; and in the step of pushing the fillers into the resin layer, a viscosity of the resin layer, a pushing rate, or a temperature at which the fillers are pushed into is adjusted to have a condition that the surface of the resin layer in the vicinity of the filler has a concavity with respect to a tangent plane to a central portion of the resin layer surface between adjacent fillers. In particular, the present invention provides the method of producing the filler-containing film formed to have a condition where, at this concavity, the surface of the resin layer around the filler is absent with respect to the tangent plane or where a resin amount of the resin layer directly above the filler is less than a resin amount in the case where the surface of the resin layer directly above the filler is at the tangent plane.

Advantageous Effects of Invention

The filler-containing film of an embodiment of the present invention has a filler-dispersed layer in which fillers are dispersed in a resin layer. In this filler-dispersed layer, the surface of the resin layer in the vicinity of the filler has a concavity with respect to the tangent plane to the central portion of the resin layer surface between adjacent fillers. That is, when the filler is exposed from the resin layer, the surface around the exposed filler of the resin layer has a concavity, the resin layer is absent at the concavity portion with respect to the tangent plane, and thus the resin amount is reduced. Furthermore, when the filler is embedded in the resin layer without being exposed from the resin layer, the surface of the resin layer directly above the filler has a concavity, and thus the resin amount of the concavity portion with respect to the tangent plane is reduced.

Therefore, when a concavity exists in the resin layer around the filler exposed from the resin layer, the filler is readily pushed by an article as well as the resin flow is reduced during the pressure bonding of the filler-containing film to the article due to the reduced resin amount at the concavity portion. Furthermore, when two articles are pressure-bonded through the filler-containing film, the resin tends not to be an obstacle to the sandwiching of the filler and crushing of the filler into a flat shape. Furthermore, by the amount of the reduced resin around the filler due to the concavity, the resin flow that leads to an unnecessary flow of the filler is reduced. Therefore, the filler capturing performance at an article is improved, and in particular, when the filler-containing film is configured to be an anisotropic conductive film, conduction reliability is improved due to the improvement of the conductive particle capturing performance at terminals.

Furthermore, when the resin layer directly above the filler embedded in the resin layer has a concavity, application of the pushing force to the filler from an article is facilitated during the pressure bonding of the filler-containing film to the article. Furthermore, by the amount of the reduced resin directly above the filler due to the concavity, the resin flow that leads to an unnecessary flow of the filler is reduced. Therefore, also in this case, the filler capturing performance at an article is improved, and in particular, when the filler-containing film is configured to be an anisotropic conductive film, that is, when the conductive particles as the fillers are dispersed in an insulating resin layer, conduction reliability is improved due to the improvement of the conductive particle capturing performance at terminals.

As described above, with the filler-containing film of an embodiment of the present invention, the filler capturing performance is improved, and this prevents the filler from flowing on the article, and thus the disposition of the filler can be precisely controlled. Therefore, when the filler-containing film is configured to be an anisotropic conductive film, the disposition of the conductive particles relative to the terminals can be precisely controlled, and thus the filler-containing film can be used for connection to an electronic component with a fine pitch, for example, a terminal width of 6 μm to 50 μm and a space between terminals of 6 μm to 50 μm. Furthermore, when the size of the conductive particle is less than 3 μm (e.g. from 2.5 to 2.8 μm), the effective width of the connection terminal (the width of the parts overlapped in the planar view among width of a pair of terminals facing each other at the time of connection) is 3 μm or greater, and the minimum interterminal spacing is 3 μm or greater, electronic components can be connected without causing a short circuit.

Furthermore, because the disposition of the conductive particles can be precisely controlled, when electronic component with a normal pitch is connected, the disposed area of the conductive particles and/or the layout of an area, in which the number density of the conductive particles is varied, can be corresponded to the layout of terminals of various electronic components.

Furthermore, in the filler-containing film of an embodiment of the present invention, when the resin layer directly above the filler embedded in the resin layer has a concavity, the position of the filler is clearly known by observing the appearance of the filler-containing film. This facilitates the product inspection based on the appearance, and also facilitates identification of front or back face of the film. Therefore, when the filler-containing film is pressure-bonded to an article, it becomes easy to check the face to be used, that is, which film face of the filler-containing film is adhered to the article. When the filler-containing film is produced, similar advantages are achieved.

In addition, with the filler-containing film of an embodiment of the present invention, the resin layer is not necessarily photocured to fix the disposition of the filler, and therefore the resin layer may have tackiness during the pressure bonding of the filler-containing film to the article. Therefore, when final pressure bonding is performed after the temporal pressure bonding of the filler-containing film to the article, workability during the temporal pressure bonding is improved, and workability during the final pressure bonding to the article after the temporal pressure bonding is also improved.

Meanwhile, the production method of an embodiment of the present invention adjusts the viscosity of the resin layer, the pushing rate, or the temperature at which the filler is embedded in the resin layer so that the concavity described above is formed in the resin layer. Therefore, the filler-containing film of an embodiment of the present invention that achieves the effects described above can be easily produced.

BRIEF DESCRIPTION OF DRAWINGS

FIG. 14 is Table 2A showing details and results for the identified Examples.

FIG. 15 is Table 2B showing details and results for the identified Examples.

DESCRIPTION OF EMBODIMENTS

Figure 1A:
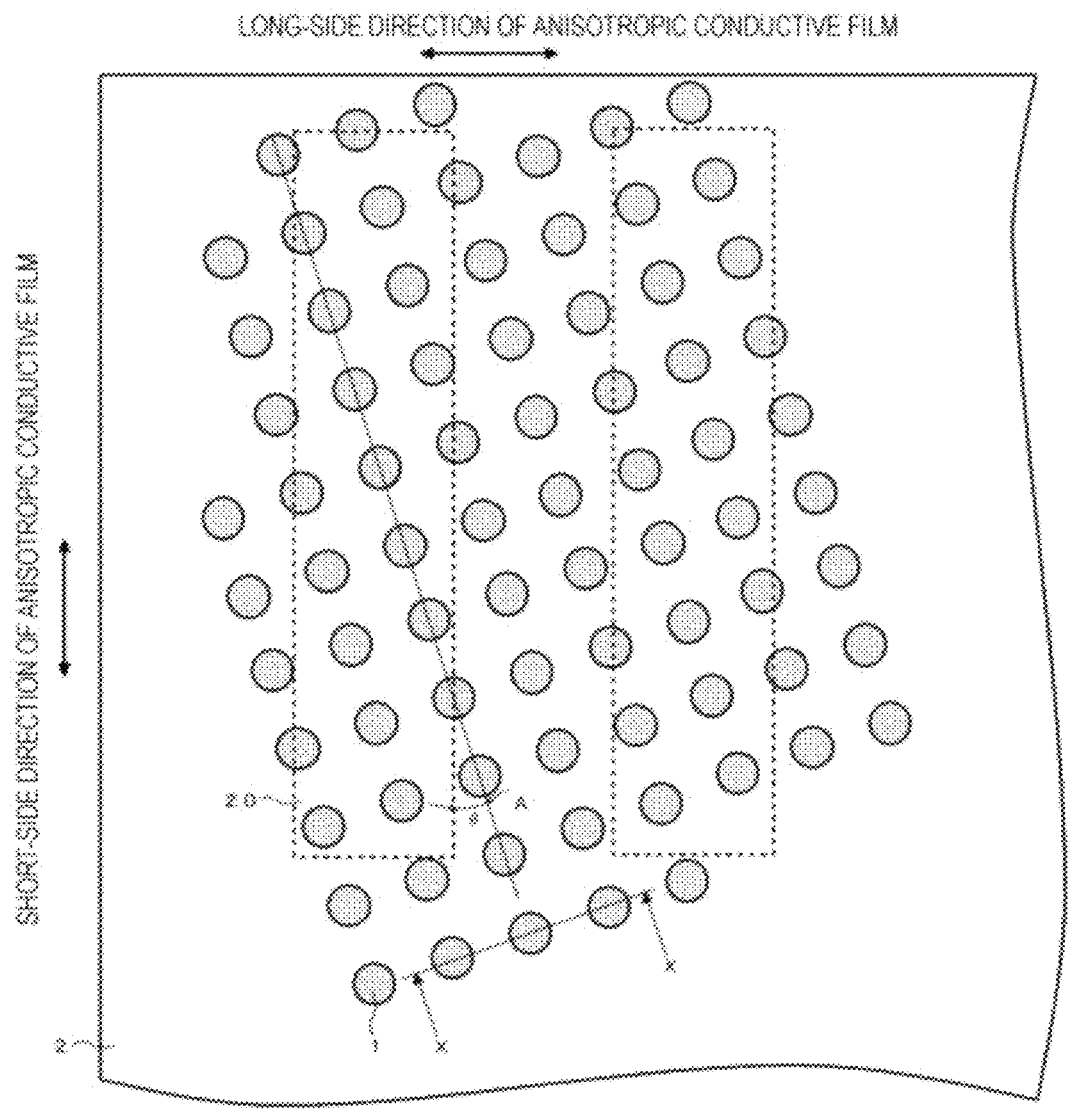
FIG. 1A is a plan view illustrating the disposition of conductive particles in an anisotropic conductive film 10A of an example, which is an embodiment of the filler-containing film of the present invention.

Hereinafter, the filler-containing film of an embodiment of the present invention will be described in detail while referring to the drawings. Note that, in the drawings, identical reference signs indicate the same or equivalent constituents.

Overall Structure of Filler-Containing Film

Figure 1B:
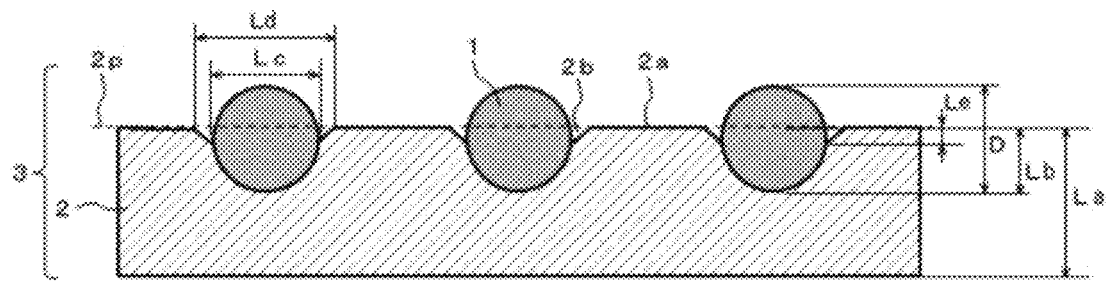
FIG. 1B is a cross-sectional view illustrating the anisotropic conductive film 10A of an example, which is an embodiment of the filler-containing film of the present invention.

FIG. 1A is a plan view illustrating the disposition of fillers in a filler-containing film 10A of an embodiment of the present invention, and FIG. 1B is an X-X cross-sectional view thereof. This filler-containing film 10A is used as an anisotropic conductive film, and conductive particles are dispersed as the fillers 1 in an insulating resin layer 2.

The filler-containing film 10A, such as an anisotropic conductive film, in an embodiment of the present invention may be in a film form having a long length, such as a length of 5 m or longer, or may be a wound body which is wound around a winding core.

The filler-containing film 10A is composed of a filler-dispersed layer 3. In the filler-dispersed layer 3, the fillers 1 are regularly dispersed in a condition that the fillers 1 are exposed at one face of the resin layer 2. The fillers 1 are not in contact with each other in a planar view of the film, and the fillers 1 are regularly dispersed without being overlapped each other in a film thickness direction and constitute a monolayered filler layer including the fillers 1 that are evenly positioned in the film thickness direction.

Figure 4:
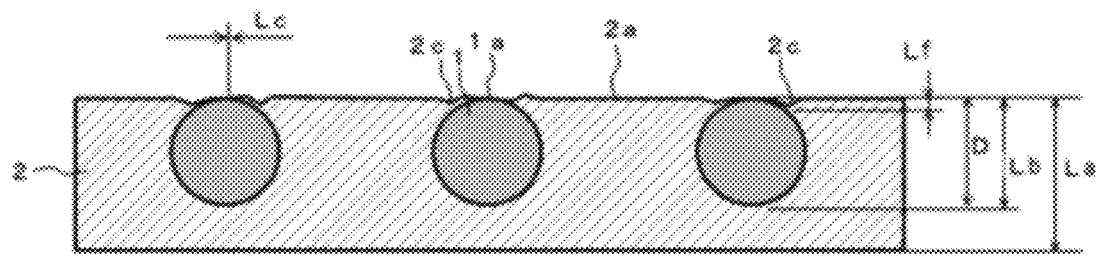
FIG. 4 is a cross-sectional view illustrating an anisotropic conductive film 10D of an example, which is an embodiment of the filler-containing film of the present invention.
Figure 6:
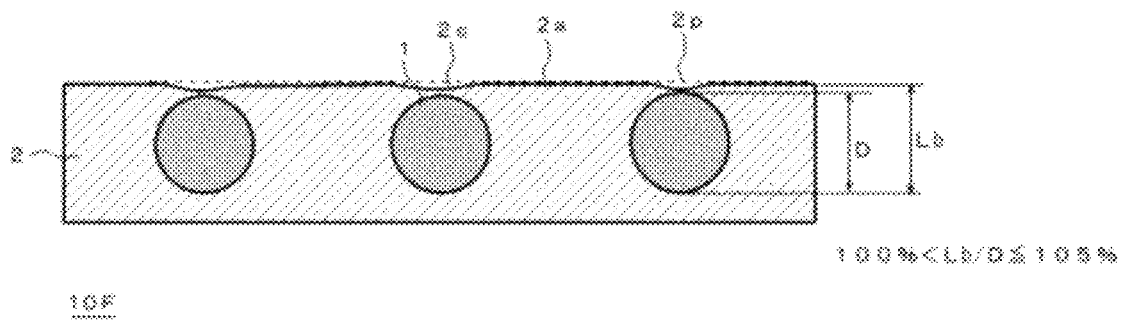
FIG. 6 is a cross-sectional view illustrating an anisotropic conductive film 10F of an example, which is an embodiment of the filler-containing film of the present invention.

In the surface 2a around each of the filler 1 of the resin layer 2, a concavity 2b is formed with respect to a tangent plane 2p for the resin layer 2 at the central portion between adjacent fillers 1. As described below, in the filler-containing film of an embodiment of the present invention, a concavity 2c may be formed on the surface of the resin layer directly above the filler 1 embedded in the resin layer 2 (FIGS. 4 and 6).

Dispersion State of Filler

The dispersion state of the filler of an embodiment of the present invention includes a state in which the fillers 1 are randomly dispersed, as well as a state in which the fillers 1 are dispersed in a regular disposition. In either case, evenly disposed positions in the film thickness direction are preferable from the perspective of capturing stability. Note that "the positions of the fillers 1 are evenly disposed in the film thickness direction" is not limited to the case where the positions of the fillers 1 are evenly disposed in a single depth in the film thickness direction but also includes an aspect where the fillers 1 each exist in the interfaces on the front and back surfaces of the resin layer 2 or a vicinity thereof.

Furthermore, to achieve uniform optical, mechanical, or electrical characteristics of the filler-containing film, especially, in the case where the filler-containing film is an anisotropic conductive film, the fillers 1 are preferably regularly arranged in the planar view of the film from the perspective of suppressing short circuiting. An aspect of an arrangement can be decided depending on an article to which the filler-containing film is pressure-bonded, and for example, an aspect of the arrangement of the conductive particles is not particularly limited because the aspect of the arrangement of the conductive particles for an anisotropic conductive film can be decided based on the layout of terminals and bumps. For example, a square lattice arrangement as illustrated in the planar view of the film in FIG. 1A can be employed. Other examples of an aspect of a regular arrangement of the fillers include lattice arrangements such as a rectangular lattice, a rhombic lattice, a hexagonal lattice, and a triangular lattice. A combination of a plurality of lattices having different shapes may also be selected. As an aspect of the arrangement of the fillers, rows of particles in which fillers are arranged linearly at a prescribed spacing may be arranged in parallel at a prescribed spacing. Furthermore, an aspect where omissions of the fillers regularly exist in a prescribed direction of the film may be employed.

Due to the fillers 1 that are not in contact with each other and that are regularly arranged in a lattice form or the like, pressure can be uniformly applied to each of the fillers 1 during the pressure bonding of the filler-containing film to an article, and the unevenness of connecting condition can be reduced. Furthermore, the existence of repeated omissions of the fillers in the long-side direction of the film or gradual increasing or decreasing in the number of omissions of the fillers in the long-side direction of the film enables lot control and can impart traceability (properties that enables tracing) to the filler-containing film and a connection structure including the filler-containing film. This is also effective for the prevention of forgery, determination of authenticity, prevention of unfair use, and the like of the filler-containing film and/or a connection structure using the filler-containing film.

Therefore, for the anisotropic conductive film, a regular arrangement of the conductive particles can reduce the unevenness of conduction resistance in the case where an electronic component is connected by the anisotropic conductive film. Furthermore, the regular arrangement of the conductive particles in the planar view of the film and evenly disposed positions of the conductive particles in the film thickness direction are more preferable to achieve both capturing stability and short circuit suppression in a compatible manner.

On the other hand, when the space between terminals of electronic components to be connected is wide and a short circuit is less likely to occur, the conductive particles may be randomly dispersed without being regularly arranged.

When the fillers are regularly arranged in the filler-containing film, the lattice axis or arrangement axis of the arrangement may be parallel to the long-side direction of the film or to the direction orthogonal to the long-side direction, or may cross the long-side direction of the film, and may be decided depending on an article to be connected. When the filler-containing film is an anisotropic conductive film, the lattice axis or the arrangement axis can be decided depending on terminal width, terminal pitch, and the like. For example, in the case of an anisotropic conductive film for a fine pitch, as illustrated in FIG. 1A, the lattice axis A of the conductive particles 1 intersects obliquely with the long-side direction of the anisotropic conductive film 10A, and the angle θ formed by the long-side direction (short-side direction of the film) of a terminal 20 to be connected with the anisotropic conductive film 10A and the lattice axis A is preferably from 6° to 84° and more preferably from 11° to 74°.

The distance between fillers in the filler-containing film can also be decided depending on an article to be connected, and when the filler-containing film is an anisotropic conductive film, the distance between particles of the conductive particles 1 can be appropriately decided depending on the size of a terminal to be connected by the anisotropic conductive film or the terminal pitch. For example, when the anisotropic conductive film is suited to a fine pitch chip-on-glass (COG), from the perspective of preventing the occurrence of short circuits, the minimum interparticle spacing is preferably not less than 0.5 times, and more preferably greater than 0.7 times, the conductive particle diameter D. On the other hand, the upper limit of minimum interparticle spacing can be decided depending on the purpose of the filler-containing film. For example, from the perspective of difficulty in the production of the filler-containing film, the minimum interparticle spacing is preferably not greater than 100 times, and more preferably not greater than 50 times, the conductive particle diameter D. Furthermore, from the perspective of the conductive particle 1 capturing performance at terminals at the time of an anisotropically conductive connection, the minimum interparticle spacing is preferably not greater than 4 times, and more preferably not greater than 3 times, the conductive particle diameter D.

Furthermore, for the filler-containing film of an embodiment of the present invention, the area occupancy ratio of the fillers calculated by the following equation is preferably 35% or less, and more preferably from 0.3 to 30%.

Area occupancy ratio (%)=[number density of fillers in planar view]×[average of area of one filler in planar view]×100

Note that measurement areas of the number density of the fillers are preferably set to a randomly chosen plurality of positions (preferably 5 positions or greater, and more preferably 10 positions or greater) of rectangular areas each having a size of one edge of 100 μm or greater, and the total area of the measurement area is preferably 2 mm² or greater. The size or the number of each area may be appropriately adjusted depending on the condition of the number density. For example, as an example of the case where the number density of the anisotropic conductive film that is used for a fine pitch is relatively large, the number densities are measured for 200 positions of areas each having an area of 100 μm×100 μm (2 mm²) that are randomly chosen from the anisotropic conductive film, by using a measurement image taken by a metallurgical microscope or the like, and then the average of the number densities is calculated to obtain "the number density of the conductive particles in a planar view" in the formula described above. The area having an area of 100 μm×100 μm becomes an area where at least one bump exists in a connection targeted article having a bump spacing of 50 μm or less.

Note that, when the area occupancy ratio is within the range described above, the value of number density is not particularly limited. However, when the filler-containing film is an anisotropic conductive film, practically, the number density needs to be 30 particles/mm² or greater and is preferably from 150 to 70000 particles/mm², and especially when the filler-containing film is used for a fine pitch, the number density is preferably from 6000 to 42000 particles/mm², more preferably from 10000 to 40000 particles/mm², and even more preferably from 15000 to 35000 particles/mm².

In addition to the determination of the number density of the fillers by observation using a metallurgical microscope as described above, the number density may be determined by measuring an observation image by image analysis software (e.g. WinROOF, available from Mitani Corporation, or the like). The observation method and the measurement method are not limited to those described above.

Furthermore, the average of the area in the planar view of one filler is determined by the measurement of an observation image of the film surface by a metallurgical microscope, an electron microscope such as an SEM, or the like. Image analysis software may be used. The observation method and the measurement method are not limited to those described above.

The area occupancy ratio is an indicator of thrust required for a pressing jig to pressure-bond the filler-containing film to an article, and the area occupancy ratio is preferably 35% or less, and more preferably from 0.3 to 30%. This is because of the following reasons. That is, to be suited to a fine pitch, for an anisotropic conductive film, the distance between particles of conductive particles has been made smaller in the related art as long as short circuits do not occur, and the number density has been increased. However, when the number density is increased in such a manner, the number of terminals of an electronic component is increased, and greater thrust is required for a pressing jig to pressure-bond the anisotropic conductive film to the electronic component, as a total connection area per one electronic component is increased. Therefore, it is anticipated that a problem of insufficient pushing force for a known pressing jig may occur. Such a problem of the thrust required for a pressing jig is not limited to anisotropic conductive films and is common to general filler-containing films. On the other hand, when the area occupancy ratio is set to preferably 35% or less, and more preferably 30% or less, as described above, it becomes possible to suppress the thrust required for a pressing jig to pressure-bond the filler-containing film to an article to be low.

Filler

The filler 1 in an embodiment of the present invention is appropriately selected depending on the purpose of the filler-containing film and its needed properties, such as hardness and optical performance, and is selected from the group consisting of publicly known inorganic fillers (metals, metal oxides, metal nitrides, and the like), organic fillers (resin particles, rubber particles, and the like), and fillers in which an organic raw material and inorganic raw material are mixed (e.g. particles in which a core is formed from a resin material and a surface is metal-plated (metal-coated resin particles), substances in which insulating microparticles are attached to a surface of a conductive particle, substances in which a surface of a conductive particle is subjected to insulation treatment, and the like). For example, for optical films and matte films, silica fillers, titanium oxide fillers, styrene fillers, acryl fillers, melamine fillers, various titanates, and the like can be used. For films for capacitors, titanium oxide, magnesium titanate, zinc titanate, bismuth titanate, lanthanum oxide, calcium titanate, strontium titanate, barium titanate, barium zirconate titanate, lead zirconate titanate, mixtures of these, and the like can be used. For an adhesive film, polymer-based rubber particles, silicone rubber particles, and the like can be contained. For an anisotropic conductive film, conductive particles are contained. Examples of the conductive particles include particles of metals such as nickel, cobalt, silver, copper, gold, and palladium, particles of alloys such as solder, metal-coated resin particles, metal-coated resin particles in which insulating microparticles are attached to the surfaces, and the like. A combination of two or more materials may also be used. Among these, the metal-coated resin particles are preferable from the perspectives of facilitating the maintenance of the contact with terminals due to repulsion of resin particles after connection and achieving stable conduction performance. Furthermore, the surface of the conductive particles may be subjected to insulation treatment that does not cause problems in conduction property by publicly known techniques. The fillers exemplified for each purpose described above are not limited to these purposes, and as necessary, the fillers may be contained in a filler-containing film for another purpose. Furthermore, in a filler-containing film for each purpose, as necessary, two or more types of fillers may be used in combination.

The particle diameter D of the filler 1 is decided appropriately depending on the purpose of the filler-containing film. For example, for an anisotropic conductive film, the particle diameter D is preferably from 1 μm to 30 μm, and more preferably from 3 μm to 9 μm. The reason for this is to accommodate variations in height of the wiring, to suppress an increase in conduction resistance, and to suppress the occurrence of a short circuit.

The particle diameter D of the filler before dispersion in the resin layer 2 can be measured using a common particle diameter distribution analyzer, and the average particle diameter can also be determined by using the particle diameter distribution analyzer. An example of the particle size distribution analyzer is the FPIA-3000 (from Malvern Panalytical Ltd.). Meanwhile, the particle diameter D of the filler in the filler-containing film (i.e. the particle diameter D after the filler is dispersed in the resin layer) can be determined from observation using an electron microscope, such as an SEM. In this case, the sample number for measuring the particle diameter D is desirably 200 or greater. Furthermore, when the shape of the filler is not spherical, a maximum length or a diameter of a shape obtained by estimating the shape as a sphere, based on a planar image or a cross-sectional image, can be used as the particle diameter D of the filler.

Note that, for example, in the case where a filler in which insulating microparticles are attached to the surface is used to improve insulation properties of conductive particles of an anisotropic conductive film, the particle diameter of the filler in the present invention refers to a particle diameter that does not include the insulating microparticles on the surface.

Resin Layer

Viscosity of Resin

The minimum melt viscosity of the resin layer 2 in an embodiment of the present invention is not particularly limited and can be appropriately decided depending on the purpose of the filler-containing film, the method of producing the filler-containing film, and the like. For example, as long as the concavities 2b and 2c described above can be formed, the minimum melt viscosity can be approximately 1000 Pa·s depending on the method of producing the filler-containing film. Meanwhile, when a method that holds the fillers at prescribed dispositions on the surface of the resin layer and pushes the fillers into the resin layer is performed as the method of producing the filler-containing film, the minimum melt viscosity of the resin is preferably not less than 1100 Pa·s from the perspective of ensuring that the resin layer enables film formation.

Furthermore, as described below for the method of producing the filler-containing film, from the perspective of forming concavities 2b around the exposed portions of the fillers 1 pushed into the resin layer 2, as illustrated in FIG. 1B, or from the perspective of forming concavities 2c directly above the fillers 1 pushed into the resin layer 2, as illustrated in FIGS. 4 and 6, the minimum melt viscosity is preferably 1500 Pa·s or greater, more preferably 2000 Pa·s or greater, even more preferably from 3000 to 15000 Pa·s, and yet even more preferably from 3000 to 10000 Pa·s. The minimum melt viscosity may be determined in the following manner, for example. A rotary rheometer (available from TA Instruments) is used, a measurement pressure of 5 g is maintained to be constant, and a measurement plate of 8 mm in diameter is used. More specifically, the minimum melt viscosity can be determined, in a temperature range of 30 to 200° C., by setting the temperature increase rate to 10° C./min, the measurement frequency to 10 Hz, and the load fluctuation relative to the measurement plate to 5 g.

The minimum melt viscosity of the resin layer 2 is set to a high viscosity of 1500 Pa·s or greater, and thereby the unnecessary transfer of the filler can be suppressed in the pressure bonding of the filler-containing film to an article. Especially, when the filler-containing film is an anisotropic conductive film, the flowing of the conductive particles, which should be held between terminals at the time of an anisotropically conductive connection, caused by resin flow can be prevented.

Furthermore, when the filler-dispersed layer 3 of a filler-containing film 10A is formed by pushing the fillers 1 into the resin layer 2, the resin layer 2 at the time of pushing the fillers 1 therein is a highly viscous material that forms concavities 2b around the fillers 1 in the resin layer 2 by the plastic deformation of the resin layer 2 (FIG. 1B) when the fillers 1 are pushed into the resin layer 2 so that the fillers 1 are exposed from the resin layer 2, or therein is a highly viscous material that forms concavities 2c directly above the fillers 1 of the surface of the resin layer 2 (FIG. 6) when the fillers 1 are pushed into the resin layer 2 so that the fillers 1 are not exposed from the resin layer 2 and are embedded in the resin layer 2. Therefore, the lower limit of the viscosity at 60° C. of the resin layer 2 is preferably 3000 Pa·s or greater, more preferably 4000 Pa·s or greater, and even more preferably 4500 Pa·s or greater, and the upper limit thereof is preferably 20000 Pa·s or less, more preferably 15000 Pa·s or less, and even more preferably 10000 Pa·s or less. This measurement is made with the same measurement method as in the case of the minimum melt viscosity, and the viscosity can be determined by extracting the value at a temperature of 60° C.

Specifically, the viscosity of the resin layer 2 when the fillers 1 are pushed into the resin layer 2 depends on the shape and the depth of the concavities 2b and 2c to be formed, and the lower limit thereof is preferably 3000 Pa·s or greater, more preferably 4000 Pa·s or greater, and even more preferably 4500 Pa·s or greater, and the upper limit thereof is preferably 20000 Pa·s or less, more preferably 15000 Pa·s or less, and even more preferably 10000 Pa·s or less. In addition, such viscosity is achieved at a temperature of preferably from 40 to 80° C. and more preferably from 50 to 60° C.

As described above, because the concavities 2b around the fillers 1 exposed from the resin layer 2 (FIG. 1B) are formed, the resistance applied to the flattening of the fillers 1 from the resin at the time of the pressure bonding of the filler-containing film to an article is reduced compared to the case where no concavities 2b are provided. Therefore, when the filler-containing film is an anisotropic conductive film, the conductive particles are easily held between terminals at the time of an anisotropically conductive connection, and thus conduction performance is improved, and capturing performance is also improved.

Furthermore, because the concavities 2c are formed directly above the fillers 1, which are not exposed from and are embedded in the resin layer 2, on the surface of the resin layer 2 (FIGS. 4 and 6), the pressure at the time of the pressure bonding of the filler-containing film to an article tends to concentrate at the filler 1 compared to the case where no concavities 2c are provided. Therefore, when the filler-containing film is an anisotropic conductive film, the conductive particles are easily held between terminals at the time of an anisotropically conductive connection, and thus capturing performance and conduction performance are improved.

Layer Thickness of Resin Layer

In the filler-containing film of an embodiment of the present invention, the ratio of the layer thickness La of the resin layer 2 to the particle diameter D of the filler 1 (La/D) is preferably from 0.6 to 10. Note that the particle diameter D of the filler 1 refers to the average particle diameter thereof. When the layer thickness La of the resin layer 2 is too large, the filler tends to get out of position at the time of the pressure bonding of the filler-containing film to an article. Therefore, when the filler-containing film is an optical film, variations occur in the optical characteristics. Furthermore, when the filler-containing film is an anisotropic conductive film, the conductive particle capturing performance at terminals at the time of an anisotropically conductive connection is reduced. This trend is marked when La/D exceeds 10. Therefore, La/D is more preferably not greater than 8 and even more preferably not greater than 6. Conversely, when the layer thickness La of the resin layer 2 is too small and La/D is less than 0.6, it becomes difficult to keep the fillers 1 in a prescribed particle dispersion state or a prescribed arrangement with the resin layer 2. Therefore, when the filler-containing film is an anisotropic conductive film, especially, when the terminal to be connected is a high-density COG, the ratio (La/D) of the layer thickness La of the insulating resin layer 2 to the particle diameter D of the conductive particles 1 is preferably from 0.8 to 2. Meanwhile, when the risk of the occurrence of short circuits is considered to be low due to the bump layout of an electronic component to be connected or the like, the lower limit of the ratio (La/D) may be 0.25 or greater.

Composition of Resin Layer

In an embodiment of the present invention, the resin layer 2 may be formed from a thermoplastic resin composition, a highly viscous adhesive resin composition, and/or a curable resin composition. The resin composition constituting the resin layer 2 is appropriately selected depending on the purpose of the filler-containing film, and whether the resin layer 2 has insulation properties is also decided depending on the purpose of the filler-containing film.

Note that the curable resin composition can be formed from, for example, a thermo-polymerizable composition containing a thermo-polymerizable compound and a thermal polymerization initiator. As necessary, a photopolymerization initiator may be contained in the thermo-polymerizable composition.

When the thermal polymerization initiator and the photopolymerization initiator are used in combination, a substance that also functions as a photopolymerizable compound may be used as the thermo-polymerizable compound, or another photopolymerizable compound may be contained in addition to the thermo-polymerizable compound. In addition to the thermo-polymerizable compound, another photopolymerizable compound is preferably contained. For example, a cationic curing initiator is used as a thermal polymerization initiator, an epoxy resin is used as a thermo-polymerizable compound, a photoradical polymerization initiator is used as a photopolymerization initiator, and an acrylate compound is used as a photopolymerizable compound.

A plurality of types of photopolymerization initiators which react with lights of different wavelengths may be contained. As a result, different wavelengths can be selectively used for the photocuring of a resin forming a film of the resin layer at the time of the production of the filler-containing film and for the photocuring of the resin at the time of the pressure bonding of the filler-containing film to an article.

All or a portion of the photopolymerizable compounds contained in the resin layer may be photocured by means of photocuring at the time of the production of the filler-containing film. As a result of this photocuring, the disposition of the fillers 1 in the resin layer 2 is maintained or stabilized, which yields prospects for the suppression of short circuits and the improvement of capturing performance. Furthermore, as a result of this photocuring, the viscosity of the resin layer may be appropriately adjusted during the production step of the filler-containing film.

The compounded amount of the photopolymerizable compound in the resin layer is preferably 30 mass % or less, more preferably 10 mass % or less, and even more preferably less than 2 mass %. This is because, when the amount of the photopolymerizable compound is too large, the thrust required for pushing at the time of the pressure bonding of the filler-containing film to an article increases.

Examples of the thermo-polymerizable composition include thermal radical polymerizable acrylate-based compositions containing a (meth)acrylate compound and a thermal radical polymerization initiator; and thermal cationic polymerizable epoxy compositions containing an epoxy compound and a thermal cationic polymerization initiator. In place of the thermal cationic polymerizable epoxy composition containing a thermal cationic polymerization initiator, a thermal anionic polymerizable epoxy composition containing a thermal anionic polymerization initiator may be used. Furthermore, a plurality of types of polymerizable compositions may be used in combination as long as no particular problems arise. An example of such combined use is the combined use of a thermal cationic polymerizable compound and a thermal radial polymerizable compound.

Herein, the (meth)acrylate compound may be an existing known thermally polymerizable (meth)acrylate monomer. Examples thereof include monofunctional (meth)acrylate-based monomers and polyfunctional, that is, two or more functional, (meth)acrylate-based monomers.

Examples of the thermal radical polymerization initiator may include organic peroxides and azo compounds. In particular, organic peroxides may be preferred because they do not generate nitrogen, which can induce bubbles.

The amount of the thermal radical polymerization initiator to be used preferably ranges from 2 to 60 parts by mass, and more preferably from 5 to 40 parts by mass, per 100 parts by mass of a (meth)acrylate compound. When the amount is too small, insufficient curing will occur. When the amount is too large, the product life will decrease.

Examples of the epoxy compound may include bisphenol A type epoxy resins, bisphenol F type epoxy resins, novolak type epoxy resins, modifications of these epoxy resins, and cycloaliphatic epoxy resins. Two or more of these may be used in combination. An oxetane compound may be used in addition to the epoxy compound.

The thermal cationic polymerization initiator may be a known thermal cationic polymerization initiator for epoxy compounds. Examples of the initiator include iodonium salts, sulfonium salts, phosphonium salts, and ferrocenes, which generate acid via heat. In particular, aromatic sulfonium salts, which exhibit good temperature latency, may be preferred.

The amount of the thermal cationic polymerization initiator to be used preferably ranges from 2 to 60 parts by mass, and more preferably from 5 to 40 parts by mass, per 100 parts by mass of an epoxy compound. When the amount is too small, insufficient curing tends to occur. When the amount is too large, the product life tends to decrease.

A publicly known curing agent that is ordinarily used can be used as the thermal anionic polymerization initiator. Examples include organic acid dihydrazide, dicyandiamide, amine compounds, polyamide amine compounds, cyanate ester compounds, phenol resins, acid anhydride, carboxylic acid, tertiary amine compounds, imidazole, Lewis acid, Bronsted acid salts, polymercaptan-based curing agents, urea resins, melamine resins, isocyanate compounds, and block isocyanate compounds. One type of these may be used alone, or two or more types may be used in combination. Of these, it is preferable to use a microcapsule-type latent curing agent formed by using an imidazole-modified substance as a core and by covering the surface thereof with polyurethane.

The thermo-polymerizable composition preferably contain a film forming resin and a silane coupling agent. Examples of the film forming resin may include, phenoxy resins, epoxy resins, unsaturated polyester resins, saturated polyester resins, urethane resins, butadiene resins, polyimide resins, polyamide resins, and polyolefin resins. Two or more of these may be used in combination. Among these, phenoxy resins may be preferred from the perspectives of film forming ability, processability, and connection reliability. The weight average molecular weight is preferably 10000 or greater. Examples of the silane coupling agent may include epoxy silane coupling agents and acrylic silane coupling agents. These silane coupling agents are mostly alkoxy silane derivatives.

The thermo-polymerizable composition may also contain insulating fillers to adjust melt viscosity, in addition to the fillers 1 described above. Examples of this include silica powders and alumina powders. The insulating filler is preferably a small-sized filler having a particle diameter of 20 to 1000 nm, and the compounded amount thereof is preferably from 5 to 50 parts by mass per 100 parts by mass of the thermo-polymerizable compound (photopolymerizable composition) such as an epoxy compound. The insulating fillers that are contained separately from the fillers 1 are preferably used when the purpose of the filler-containing film is an anisotropic conductive film but may be non-insulating depending on the purpose, and for example, small-sized conductive fillers may be contained. When the filler-containing film is an anisotropic conductive film, the resin layer constituting the filler-dispersed layer can appropriately contain small-sized insulating fillers (so-called nanofillers) that are different from the fillers 1, as necessary.

The filler-containing film of an embodiment of the present invention may also contain fillers, softeners, promoters, antioxidants, colorants (pigments and dyes), organic solvents, ion scavengers, and the like besides the insulating or conductive fillers described above.

Position of Filler in Thickness Direction of Resin Layer

In the filler-containing film of an embodiment of the present invention, as the position of the fillers 1 in the thickness direction of the resin layer 2, the fillers 1 may be exposed from the resin layer 2 or may be embedded in the resin layer 2 without being exposed as described above. The ratio (Lb/D) of the distance Lb of the deepest part of the filler from the tangent plane 2p for the surface 2a of the resin layer at the central portion between adjacent fillers on which the concavities 2b and 2c are formed (hereinafter, referred to as embedded amount) to the particle diameter D of the filler 1 (hereinafter, referred to as embedding percentage) is preferably from 60% to 105%.

When the embedding percentage (Lb/D) is set to 60% or greater, a prescribed particle dispersion state or a prescribed arrangement of the fillers 1 can be maintained by the resin layer 2. When the embedding percentage is set to 105% or less, the resin amount of the resin layer that causes an unnecessary flow of the fillers at the time of the pressure bonding of the filler-containing film to an article can be reduced.

Note that, in an embodiment of the present invention, the value of the embedding percentage (Lb/D) refers to a value of the embedding percentage (Lb/D) based on 80% or greater, preferably 90% or greater, and more preferably 96% or greater, of the total number of the fillers contained in the filler-containing film. Therefore, "embedding percentage of 60% to 105%" refers to the embedding percentage of 80% or greater, preferably 90% or greater, and more preferably 96% or greater, of the total number of the fillers contained in the filler-containing film of 60% to 105%.

Due to the uniform embedding percentage (Lb/D) of all the fillers as described above, the pushing weight at the time of the pressure bonding of the filler-containing film to an article is evenly applied to the fillers. Therefore, a film adhered body to which the filler-containing film is pressure-bonded to an article can ensure uniform quality in optical characteristics, mechanical characteristics, and the like. Furthermore, when the filler-containing film is an anisotropic conductive film, the captured state of the conductive particles at terminals at the time of an anisotropically conductive connection is improved, and the stability of conduction is improved.

The embedding percentage (Lb/D) can be determined by randomly extracting not less than 10 positions of areas having an area of 30 mm² or greater from the filler-containing film, observing a part of the film cross-sectional face thereof by an SEM image, and measuring a total of not less than 50 fillers. To further improve precision, determination can be performed by measuring not less than 200 fillers.

Furthermore, the measurement of the embedding percentage (Lb/D) can be determined collectively for a certain number of fillers by adjusting focus in a planar view image. Alternatively, a laser displacement sensor (available from Keyence Corporation) may be used for the measurement of the embedding percentage (Lb/D).

Aspect of Embedding Percentage of 60% or Greater but Less than 100%

A more specific example of the embedding aspect of the fillers 1 with the embedding percentage (Lb/D) of 60% to 105% includes an aspect where the fillers 1 are embedded in an embedding percentage of 60% or greater but less than 100% so as to be exposed from the resin layer 2, like the filler-containing film 10A illustrated in FIG. 1B. In this filler-containing film 10A, the part that is in contact with the fillers 1 exposed from the resin layer 2 and the vicinity thereof on the surface of the resin layer 2 has concavities 2b that are concaved in a mortar shape with respect to the tangent plane 2p to the central portion of the surface 2a of the resin layer between adjacent fillers.

When the filler-containing film 10A having the concavities 2b is produced by pushing the fillers 1 into the resin layer 2, the lower limit of the viscosity of the resin layer 2 at the time of the pushing of the fillers 1 is preferably 3000 Pa·s or greater, more preferably 4000 Pa·s or greater, and even more preferably 4500 Pa·s or greater, and the upper limit thereof is preferably 20000 Pa·s or less, more preferably 15000 Pa·s or less, and even more preferably 10000 Pa·s or less. In addition, such viscosity is achieved at a temperature of preferably from 40 to 80° C. and more preferably from 50 to 60° C.

Aspect of Embedding Percentage of 100%

Figure 2:
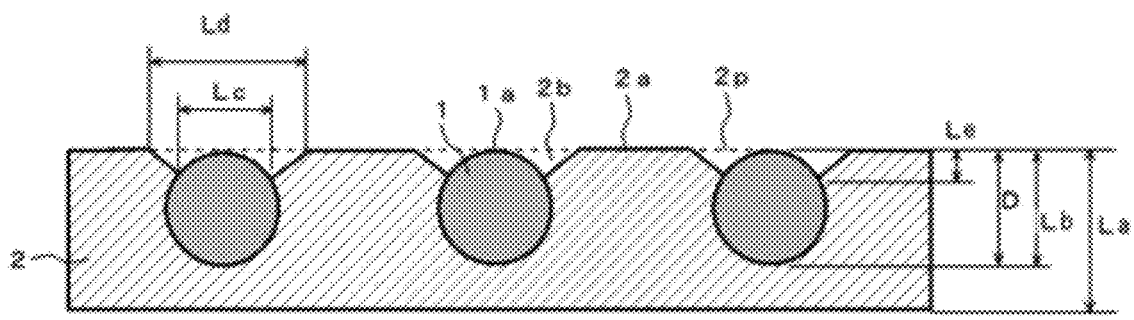
FIG. 2 is a cross-sectional view illustrating an anisotropic conductive film 10B of an example, which is an embodiment of the filler-containing film of the present invention.
Figure 3A:
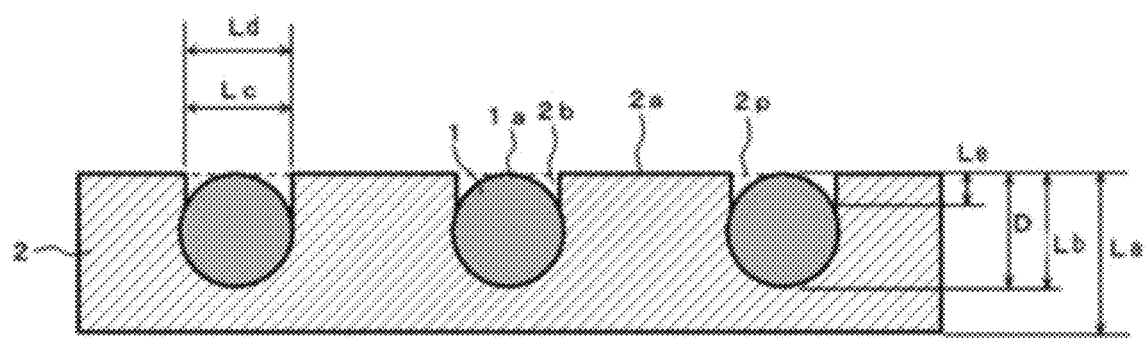
FIG. 3A is a cross-sectional view illustrating an anisotropic conductive film 10C of an example, which is an embodiment of the filler-containing film of the present invention.

Next, an aspect where the embedding percentage (Lb/D) is 100% among the filler-containing films of embodiments of the present invention is a filler-containing film that has the concavity 2b having a mortar shape, which is similar to that of the filler-containing film 10A illustrated in FIG. 1B, around the filler 1 and that has the exposed diameter Lc of the filler 1 exposed from the resin layer 2 smaller than the particle diameter D of the filler 1, like the filler-containing film 10B illustrated in FIG. 2; a filler-containing film in which the concavity 2b around the exposed portion of the filler 1 drastically appears in the vicinity of the filler 1 and in which the exposed diameter Lc of the filler 1 and the particle diameter D of the filler are substantially the same, like the filler-containing film 10C illustrated in FIG. 3A; or a filler-containing film in which the shallow concavity 2c is present on the surface of the resin layer 2 and in which the filler 1 is exposed from the resin layer 2 at one point, which is an apical part 1a of the filler 1, like the filler-containing film 10D illustrated in FIG. 4.

Figure 3B:
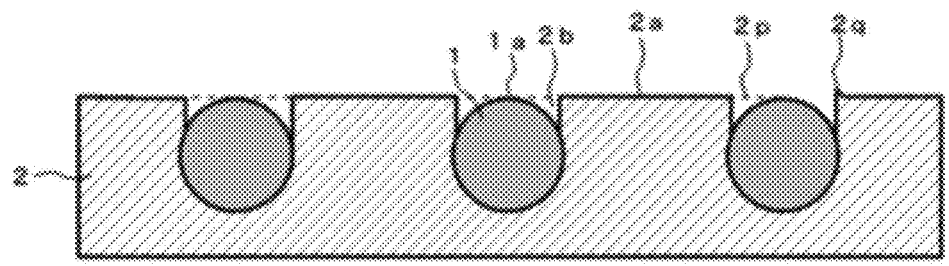
FIG. 3B is a cross-sectional view illustrating an anisotropic conductive film 10C' of an example, which is an embodiment of the filler-containing film of the present invention.

Note that a fine protruded portion 2q may be formed adjacent to the concavity 2b around the exposed portion of the filler of the resin layer 2 and/or the concavity 2c directly above the filler of the resin layer. This example is illustrated in FIG. 3B.

Because these filler-containing films 10B, 10C, 10C', and 10D have the embedding percentage of 100%, the apical part 1a of the filler 1 is flush with the surface 2a of the resin layer 2. When the apical part 1a of the filler 1 is flush with the surface 2a of the resin layer 2, compared to the case where the filler 1 is protruded from the resin layer 2 as illustrated in FIG. 1B, the resin amount in the film thickness direction around each of the fillers is less likely to be uneven at the time of the pressure bonding of the filler-containing film to an article, and an effect of reducing the filler movement due to a resin flow is achieved. Note that, even when the embedding percentage is not exactly 100%, this effect can be achieved by the alignment to a degree that the apical part of the filler 1 embedded in the resin layer 2 is substantially flush with the surface of the resin layer 2. In other words, the case where the embedding percentage (Lb/D) is roughly from 80 to 105%, especially from 90 to 100%, can be said that the apical part of the filler 1 embedded in the resin layer 2 is substantially flush with the surface of the resin layer 2, and thus the transfer of the filler due to the resin flow can be reduced.

In the filler-containing film 10D among these filler-containing films 10B, 10C, and 10D, the resin amounts around the fillers 1 are less likely to be uneven and thus the transfer of the fillers due to the resin flow can be avoided, and the excellent filler 1 capturing performance by an article is achieved because the filler 1 is exposed from the resin layer 2 at one point, which is the apical part 1a. Therefore, when the filler-containing film is configured to be an anisotropic conductive film, an effect of suppressing the slight transfer of the conductive particles captured by terminals at the time of an anisotropically conductive connection can be expected. Therefore, this aspect is advantageous for anisotropic conductive films that are used especially for the case of a fine pitch and narrow spacing between bumps.

Note that the filler-containing films 10B (FIG. 2), 10C (FIG. 3A), and 10D (FIG. 4) that have different shapes and different depths of concavities 2b and 2c can be produced by changing the viscosity of the resin layer 2, the pushing rate, the temperature at which the fillers are pushed into, or the like, as described below.

Aspect of Embedding Percentage of greater than 100%

Figure 5:
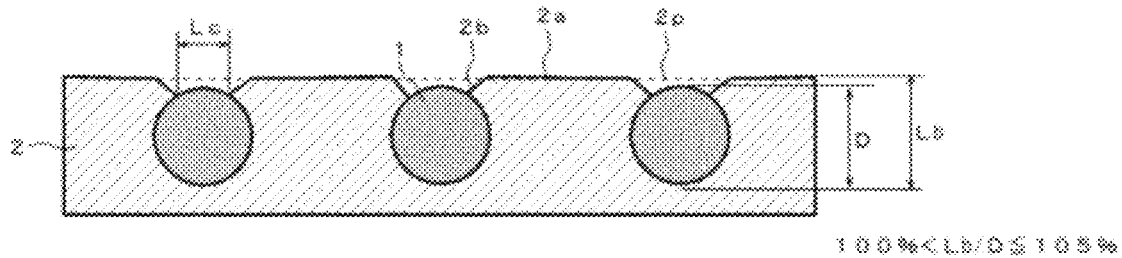
FIG. 5 is a cross-sectional view illustrating an anisotropic conductive film 10E of an example, which is an embodiment of the filler-containing film of the present invention.

An aspect where the embedding percentage is greater than 100% among the filler-containing films of embodiments of the present invention is a filler-containing film in which the filler 1 is exposed and in which the concavity 2b with respect to the tangent plane 2p is present around the exposed portion of the resin layer 2, like the filler-containing film 10E illustrated in FIG. 5; or a filler-containing film in which the filler 1 is not exposed from the resin layer 2 (i.e. exposed diameter Lc=0) and in which the concavity 2c is present relative to the tangent plane 2p directly above the filler 1 on the surface of the resin layer 2, like the filler-containing film 10F illustrated in FIG. 6.

Note that the filler-containing film 10E that has the concavity 2b around the exposed portion of the filler 1 of the resin layer 2 (FIG. 5) and the filler-containing film 10F that has the concavity 2c directly above the filler 1 of the resin layer 2 (FIG. 6) can be produced by changing the viscosity of the resin layer 2, the pushing rate, the temperature at which the filler 1 is pushed during the production thereof, or the like.

When the filler-containing film 10E illustrated in FIG. 5 is pressure-bonded to an article, the filler 1 is directly pushed by the article, and thus the bonding between the article and the filler is facilitated. When the filler-containing film is an anisotropic conductive film, the conductive particle capturing performance at terminals at the time of anisotropically conductively connecting an electronic component by the anisotropic conductive film is improved. Furthermore, when the filler-containing film 10F illustrated in FIG. 6 is pressure-bonded to an article, the filler 1 does not directly push the article, and pushing is achieved through the resin layer 2; however, because the amount of the resin present in the pushing direction is smaller than the condition illustrated in FIG. 8 (i.e. a condition where the filler 1 is embedded at the embedding percentage of greater than 100%, the filler 1 is not exposed from the resin layer 2, and the surface of the resin layer 2 is flat), the pushing force easily applies to the filler, and the unnecessary transfer of the filler 1 due to a resin flow is prevented at the time of pressure bonding to the article.

From the perspective of achieving the effect of the concavity 2b around the exposed portion of the filler of the resin layer 2 described above (FIGS. 1B, 2, 3A, 3B, and 5) and the concavity 2c directly above the filler of the resin layer (FIGS. 4 and 6), the ratio (Le/D) of the maximum depth Le of the concavity 2b around the exposed portion of the filler 1 to the particle diameter D of the filler 1 is preferably less than 50%, more preferably less than 30%, and even more preferably form 20 to 25%; the ratio (Ld/D) of the maximum diameter Ld of the concavity 2b around the exposed portion of the filler 1 to the particle diameter D of the filler 1 is preferably 100% or greater, and more preferably from 100 to 150%; and the ratio (Lf/D) of the maximum depth Lf of the concavity 2c directly above the filler 1 of the resin to the particle diameter D of the filler 1 is greater than 0, preferably less than 10%, and more preferably 5% or less.

Note that the exposed diameter Lc of the filler 1 may be not greater than the particle diameter D of the filler 1, and is preferably from 10 to 90% of the particle diameter D. The filler 1 may be exposed at one point at the apical part of the filler 1 as illustrated in FIG. 4, or the filler 1 may be completely embedded in the resin layer 2 so that the exposed diameter Lc is zero.

Meanwhile, when the apical part of the filler 1 embedded in the resin layer 2 is substantially flush with the surface of the resin layer 2 and an area in which fillers with the depth of the concavity 2b or 2c (distance of the deepest part of the concavity from the tangent plane to the central portion of the resin layer between adjacent fillers) being not less than 10% of the particle diameter (hereinafter, simply referred to as "filler that is flush with the resin layer and that has the depth of the concavity of 10% or greater") are locally concentrated exists, appearance may be deteriorated although the performance and the quality of the filler-containing film do not have any problems. Furthermore, when the filler-containing film is adhered to an article under a condition that the concavities 2b and 2c of such an area are faced to the article, the concavities 2b and 2c may be a cause of the separation (or floating) of the film from the article after the adhesion, and the like. For example, when the filler-containing film is an anisotropic conductive film, if the conductive particles that are flush with an insulating resin layer 2 and that have the depth of the concavity of 10% or greater exist concentrated in one bump, separation occurs after the adhesion with the bump, and conductivity may be reduced. Therefore, for an area that is not greater than 200 times the particle diameter of the filler from a filler, which is a randomly chosen filler that is flush with the resin layer 2 and that has the depth of the concavity of 10% or greater, the proportion of the number of the fillers that are flush with the resin layer and that have the depth of the concavity of 10% or greater is preferably 50% or less, more preferably 40% or less, and even more preferably 30% or less, relative to the total number of the fillers. On the other hand, for an area in which this proportion is greater than 50%, the concavities 2b and 2c are preferably made shallow by means such as spraying a resin on the surface of the filler-containing film. In this case, the resin to be sprayed preferably has lower viscosity than the viscosity of the resin forming the resin layer 2, and the concentration of the resin to be sprayed is preferably diluted to a degree by which the concavity of the resin layer 2 can be recognized after the spraying. The provision of the shallow concavities 2b and 2c as described above improves problems of appearance and separation described above.

Figure 7:
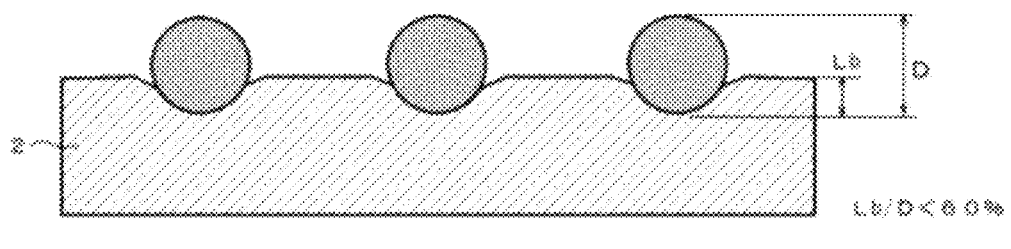
FIG. 7 is a cross-sectional view illustrating an anisotropic conductive film 10G of an example, which is an embodiment of the filler-containing film of the present invention.

Note that, as illustrated in FIG. 7, with the filler-containing film 10G having the embedding percentage (Lb/D) of less than 60%, the filler 1 on the resin layer 2 tends to roll and thus, the embedding percentage (Lb/D) is preferably 60% or greater from the perspective of improving the capturing percentage of an article for the fillers at the time of pressure bonding to the article.

Figure 8:
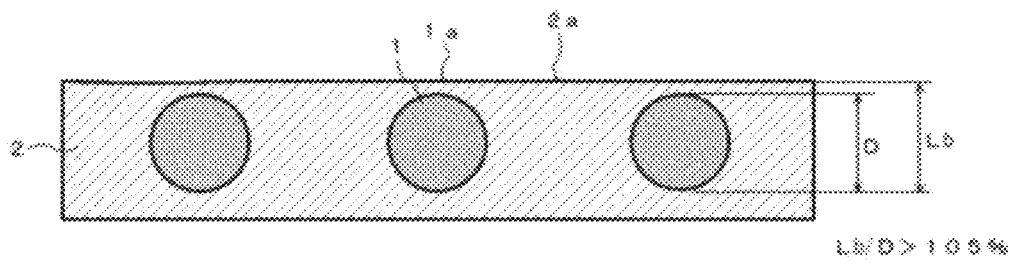
FIG. 8 is a cross-sectional view illustrating an anisotropic conductive film 10X, which is a comparative example of the filler-containing film of the present invention.
Figure 9:
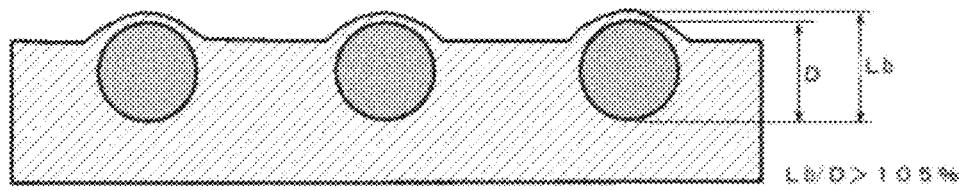
FIG. 9 is a cross-sectional view illustrating an anisotropic conductive film 10Y, which is a comparative example of the filler-containing film of the present invention.

Furthermore, in an aspect where the embedding percentage (Lb/D) is greater than 100%, when the surface of the resin layer 2 is flat like the filler-containing film 10X illustrated in FIG. 8, the amount of the resin interposed between the filler 1 and the article becomes excessively large. Furthermore, when the surface of the resin layer 2 is protruded along the shape of the filler 1, like the filler-containing film 10Y illustrated in FIG. 9, the filler 1 tends to flow due to the resin flow of the resin layer 2 at the time of pressure bonding to the article. Furthermore, the filler 1 pushes the article through the resin and does not push the article by direct contact with the article, and thus the filler tends to flow due to the resin flow because of this.

In an embodiment of the present invention, the presence of the concavities 2b and 2c of the surface of the resin layer 2 can be confirmed by observing the cross section of the filler-containing film using a scanning electron microscope and can also be confirmed by observing from a planar view. The observation of the concavities 2b and 2c are also possible by using an optical microscope or a metallurgical microscope. Furthermore, the size of the concavities 2b and 2c can be confirmed by adjusting focus when observing the image or the like. The same applies even after the spraying of the resin to deep concavities as described above.

Modified Aspect of Filler-Containing Film
Second Insulating Resin Layer

Figure 10:
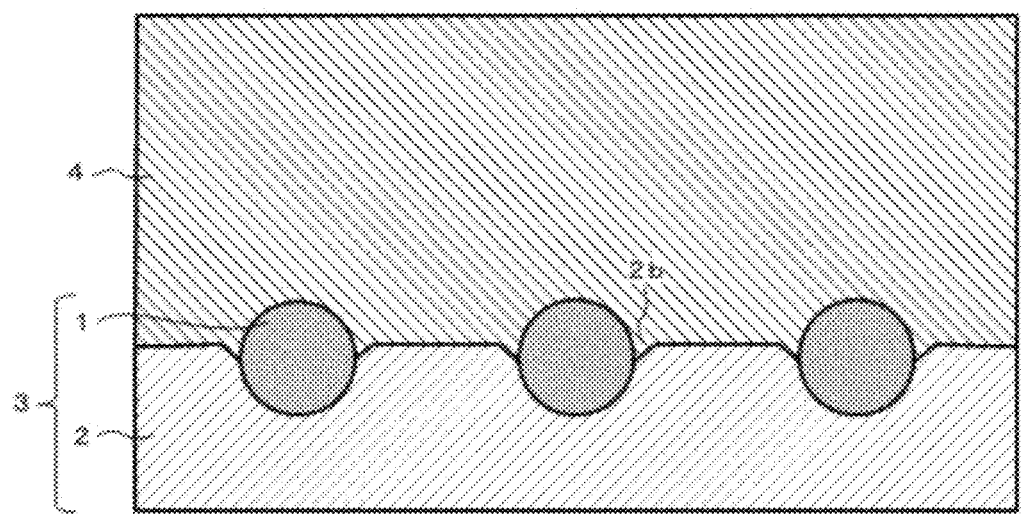
FIG. 10 is a cross-sectional view illustrating an anisotropic conductive film 10H of an example, which is an embodiment of the filler-containing film of the present invention.
Figure 11:
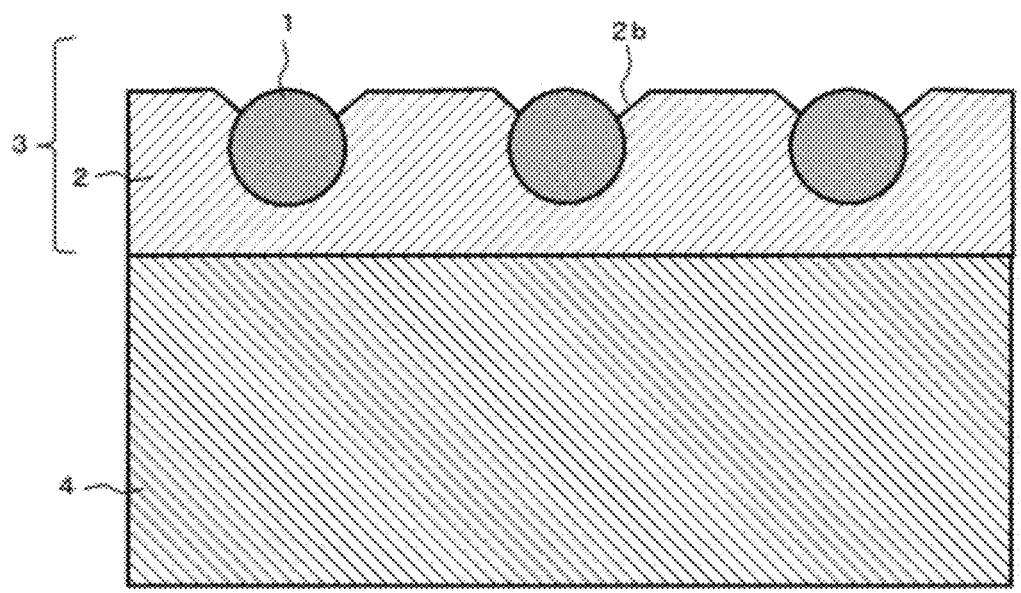
FIG. 11 is a cross-sectional view illustrating an anisotropic conductive film 10I of an example, which is an embodiment of the filler-containing film of the present invention.

In the filler-containing film of an embodiment of the present invention, like the filler-containing film 10H illustrated in FIG. 10, a second resin layer 4, which preferably has lower minimum melt viscosity than the minimum melt viscosity of the resin layer 2, may be laminated on a face, where the concavities 2b of the resin layer 2 are formed, in the filler-dispersed layer 3. The second resin layer and a third resin layer described below are layers containing no fillers 1 dispersed in the filler-dispersed layer. Furthermore, like the filler-containing film 10I illustrated in FIG. 11, a second resin layer 4, which has lower minimum melt viscosity than the minimum melt viscosity of the resin layer 2, may be laminated on a face, where the concavities 2b of the resin layer 2 are not formed (a face on the opposite side relative to the face on which the concavities are formed), of the filler-dispersed layer 3.

The second resin layer 4 may be insulative or conductive depending on the purpose of the filler-containing film. Due to the lamination of the second resin layer 4, even when surface irregularities are present on the surface of an article when the filler-containing film and the article are pressure-bonded, a space formed by the surface irregularities can be filled with the second resin layer. Therefore, when the filler-containing film is an anisotropic conductive film having an insulating resin layer as the second resin layer, spaces formed by electrodes and/or bumps of electronic components can be filled with the second resin layer when facing electronic components are anisotropically conductively connected by using the anisotropic conductive film, and thus adhesiveness between the electronic components can be improved.

Note that, when facing electronic components are anisotropically conductively connected by using the anisotropic conductive film having the second resin layer 4, the second resin layer 4 is preferably disposed on the first electronic component side, such as an IC chip, (i.e. the resin layer 2 is disposed on the second electronic component side, such as a substrate) regardless of the presence or absence of the second resin layer 4 on the face where the concavities 2b are formed. As a result, the undesired movement of the conductive particles can be avoided, and capturing performance can be improved. Note that, the first electronic component and the second electronic component are typically subjected to final pressure bonding after the anisotropic conductive film is temporarily pressure-bonded to the second electronic component while the first electronic component such as an IC chip is on the pressing jig side and the second electronic component such as a substrate is on the stage side, but depending on the size or the like of the compression bonding region of the second electronic component, the first electronic component and the second electronic component may be subjected to final pressure bonding after the anisotropic conductive film is temporarily bonded with the first electronic component.

A greater difference in the minimum melt viscosities of the resin layer 2 and the second resin layer 4 facilitates the filling of spaces formed by surface irregularities of an article to be thermocompression-bonded with the filler-containing film with the second resin layer, and thus the adhesiveness of the filler-containing film and the article is improved; or, when facing articles are thermocompression-bonded through the filler-containing film, the adhesiveness of the facing articles is improved. Furthermore, a greater difference makes the transferred amount of the resin layer 2 present in the filler-dispersed layer 3 relatively smaller, compared to the case of the second resin layer 4, and the unnecessary flow of the fillers supported by the resin layer 2 can be reduced. Therefore, when the filler-containing film is an anisotropic conductive film having an insulating second resin layer, a space formed by electrodes and/or bumps of electronic components which are anisotropically conductively connected with the anisotropic conductive film can be easily filled with the second resin layer 4, and thus an effect of improving adhesiveness between the electronic components can be expected. Furthermore, the transferred amount of the resin layer 2 which supports conductive particles in the filler-dispersed layer 3 can be made relatively smaller, compared to the case of the second resin layer, the conductive particle capturing performance at terminals tends to be improved.

The ratio of the minimum melt viscosity of the resin layer 2 to the minimum melt viscosity of the second resin layer 4 is, practically, preferably 2 or greater, more preferably 5 or greater, and even more preferably 8 or greater, although the ratio also depends on the ratio of the layer thickness of the resin layer 2 to the layer thickness of the second resin layer 4. On the other hand, when this ratio is too large, the protrusion or blocking of the resin may occur when a long filler-containing film is wound on a winding body, and therefore the ratio of the minimum melt viscosity of the resin layer 2 to the minimum melt viscosity of the second resin layer 4 is, practically, preferably 15 or less. More specifically, the preferable minimum melt viscosity of the second resin layer 4 satisfies the ratio described above and is 3000 Pa·s or less, more preferably 2000 Pa·s or less, and particularly preferably from 100 to 2000 Pa·s.

Note that the second resin layer 4 can be formed by adjusting the viscosity of a resin composition similar to the resin layer 2.

Furthermore, the thickness of the second resin layer 4 can be appropriately set depending on the purpose of the filler-containing film. From the perspective of not excessively increasing difficulty in a lamination step of the second resin layer 4, typically, the thickness is preferably 0.2 to 50 times the particle diameter of the filler. Furthermore, when the filler-containing film is an anisotropic conductive film 10H or 10I, the layer thickness of the second resin layer 4 is preferably from 4 to 20 μm, and is preferably from 1 to 8 times the conductive particle diameter.

Furthermore, in the anisotropic conductive films 10H and 10I, the minimum melt viscosity of the entire anisotropic conductive film, which combines the insulating resin layer 2 and the second resin layer 4, may be practically 8000 Pa·s or less, and to facilitate the filling of the spaces between bumps, the minimum melt viscosity may be from 200 to 7000 Pa·s, and is preferably from 200 to 4000 Pa·s, although the minimum melt viscosity also depends on the ratio of the thickness of the resin layer 2 to the thickness of the second resin layer 4.

Third Resin Layer

A third resin layer may be provided on the opposite side to the second resin layer 4, sandwiching the resin layer 2 therebetween. The third resin layer may be insulative or conductive depending on the purpose of the filler-containing film. For example, when the filler-containing film is an anisotropic conductive film having an insulating third resin layer, the third resin layer can function as a tack layer. Similarly to the case of the second resin layer, the third resin layer may also be provided to fill a space formed by an electrode or a bump of an electronic component.

The resin composition, viscosity, and thickness of the third resin layer may be the same as or different from those of the second resin layer. The minimum melt viscosity of the filler-containing film combining the resin layer 2, the second resin layer 4, and the third resin layer is not particularly limited but may be 8000 Pa·s or less, from 200 to 7000 Pa·s, or from 200 to 4000 Pa·s.

Other Aspect of Lamination

Depending on the purpose of the filler-containing film, filler-dispersed layers may be laminated; a layer that does not contain any filler, like the second resin layer, may be interposed between laminated filler-dispersed layers; and the second resin layer or the third resin layer may be provided as the outermost layer.

Method of Producing Filler-Containing Film

The method of producing the filler-containing film of an embodiment of the present invention includes a step of forming a filler-dispersed layer in which fillers are dispersed in a resin layer. This step of forming a filler-dispersed layer includes a step of allowing the fillers to be retained on a surface of the resin layer in a condition where the fillers are dispersed, and a step of pushing the filler retained on the resin layer into the resin layer.

Among these, in the step of pushing the fillers into the resin layer, the viscosity of the resin layer, the pushing rate, or the temperature at which the fillers are pushed into is adjusted so that the surface of the resin layer in the vicinity of the filler has a concavity with respect to the tangent plane to the central portion of the resin layer surface between adjacent fillers.

The minimum melt viscosity of the resin layer into which the fillers are pushed is not particularly limited as long as the concavities 2b and 2c described above can be formed. However, the minimum melt viscosity thereof is preferably 1100 Pa·s or greater, and the viscosity at 60° C. is preferably 3000 Pa·s or greater. Among these, the minimum melt viscosity is preferably 1500 Pa·s or greater, more preferably 2000 Pa·s or greater, even more preferably from 3000 to 15000 Pa·s, and particularly preferably from 3000 to 10000 Pa·s. The lower limit of the viscosity at 60° C. is preferably 3000 Pa·s or greater, more preferably 4000 Pa·s or greater, and even more preferably 4500 Pa·s or greater, and the upper limit thereof is preferably 20000 Pa·s or less, more preferably 15000 Pa·s or less, and even more preferably 10000 Pa·s or less. Therefore, the minimum melt viscosity of the resin layer in which the fillers are retained on the surface is preferably within the range described above.

When the filler-containing film is formed from a single layer of filler-dispersed layer 3, for example, the filler-containing film of an embodiment of the present invention is produced by allowing the fillers 1 to be retained in a predetermined arrangement on the surface of the resin layer 2 and pushing the fillers 1 into the resin layer by a flat plate or a roller. Note that, when the filler-containing film having an embedding percentage of greater than 100% is produced, pushing may be performed by using a push plate having a convex portion corresponding to the filler arrangement.

Note that the embedded amount of the fillers 1 in the resin layer 2 can be adjusted by the pushing force, the temperature, and the like at the time of the pushing of the fillers 1. The shape and depth of the concavities 2b and 2c can also be adjusted by the viscosity of the resin layer 2, the pushing rate, the temperature, and the like at the time of pushing. For example, when an anisotropic conductive film 10B (FIG. 2) is produced as the filler-containing film, the viscosity of the insulating resin layer 2 at the time of the pushing of the conductive particles 1 is preferably 8000 Pa·s (60° C.); when an anisotropic conductive film 10C (FIG. 3A) is produced, the viscosity of the insulating resin layer 2 at the time of the pushing of the conductive particles 1 is preferably 12000 Pa·s (70° C.); when an anisotropic conductive film 10D (FIG. 4) is produced, the viscosity of the insulating resin layer 2 at the time of the pushing of the conductive particles 1 is preferably 4500 Pa·s (60° C.); when an anisotropic conductive film 10E (FIG. 5) is produced, the viscosity of the insulating resin layer 2 at the time of the pushing of the conductive particles 1 is preferably 7000 Pa·s (70° C.); and when an anisotropic conductive film 10F (FIG. 6) is produced, the viscosity of the insulating resin layer 2 at the time of the pushing of the conductive particles 1 is preferably 3500 Pa·s (70° C.).

Furthermore, as a technique to retain the fillers 1 in the resin layer 2, a publicly known technique can be used. For example, fillers 1 are retained in a resin layer 2 by directly spraying the fillers 1 onto a resin layer 2, or by attaching the fillers 1 as a single layer onto a film that can be biaxially-stretched, biaxially-stretching the film, and pushing the resin layer 2 onto the stretched film to transfer the fillers onto the resin layer 2. Another technique is to use a transfer mold to allow the fillers 1 to be retained on the resin layer 2.

When allowing the fillers 1 to be retained on the resin layer 2 by using a transfer mold, the transfer mold may be a mold made of an inorganic material or an organic material and having openings formed by a known opening forming process, such as photolithography, or a mold to which a printing technique is applied. Examples of the inorganic material include silicon, various ceramics, glass, and metal such as stainless steel. Examples of the organic material include various resins. The transfer mold may have a plate shape, a roll shape, or another shape. Note that the present invention is not limited to these techniques.

Furthermore, a second resin layer 4 having viscosity lower than the viscosity of the resin layer 2 can be laminated on a surface on the face into which the fillers were pushed or on the other face of the resin layer 2.

When the filler-containing film is pressure-bonded to an article or when the filler-containing film is used to pressure-bond articles that are facing, to economically perform the pressure bonding, the filler-containing film preferably have a certain degree of long length. Therefore, production is performed so that the length of the filler-containing film is preferably 5 m or greater, more preferably 10 m or greater, and even more preferably 25 m or greater. On the other hand, if the filler-containing film is excessively long, a known connecting device cannot be used when the filler-containing film is pressure-bonded to an article, and thus handleability is poor. Therefore, production is performed so that the length of the filler-containing film is preferably 5000 m or less, more preferably 1000 m or less, and even more preferably 500 m or less. Such a long body of the filler-containing film is preferably a wound body which is wound around a winding core, from the perspective of excellent handleability.

Method of Using Filler-Containing Film

The filler-containing film of an embodiment of the present invention can be used similarly to known filler-containing films by being adhered to an article, and the article is not particularly limited as long as the article can be adhered to the filler-containing film. Adhesion can be performed by pressure bonding, preferably by thermocompression bonding, to various articles corresponding to the purpose of the filler-containing film. Photoirradiation may be used during this adhesion, and heat and light may be used in combination. For example, when the resin layer of the filler-containing film has sufficient adhesiveness to an article to which the filler-containing film is adhered, a film adhered body in which the filler-containing film is adhered on a surface of an article can be obtained by lightly pushing the resin layer of the filler-containing film onto the article. In this case, the surface of the article is not limited to a flat surface, may has irregularities, and may be curved as a whole. When the article is in a film shape or a flat plate shape, the filler-containing film may be adhered to the article by using a pressure-bonding roller. By this, the filler of the filler-containing film and the article may be bonded directly.

Furthermore, the filler-containing film may be placed in between a first article and a second article that are facing each other, and the filler may be held between the articles by bonding the two facing articles by using a thermocompression bonding roller or a pressure bonding tool. Furthermore, the filler-containing film may be sandwiched between the articles without direct contact between the fillers and the articles.

In particular, when the filler-containing film is an anisotropic conductive film, the anisotropic conductive film can be advantageously used when anisotropically conductively connecting a first electronic component, such as an IC chip, an IC module, or an FPC, to a second electronic component, such as an FPC, a glass substrate, a plastic substrate, a rigid substrate, or a ceramic substrate, by using a thermocompression bonding tool. An IC chip or a wafer may be stacked by using the anisotropic conductive film to form a multilayer. Note that an electronic component connected by the anisotropic conductive film of an embodiment of the present invention is not limited to the electronic components described above. Use for various electronic components that have diversified in recent years is possible.

Therefore, the present invention includes an adhered body in which the filler-containing film of an embodiment of the present invention is adhered to various articles by pressure bonding, and a method of producing an adhered body. In particular, when the filler-containing film is an anisotropic conductive film, the present invention also includes a method of producing a connection structure in which electronic components are anisotropically conductively connected by using the anisotropic conductive film, and a connection structure obtained by this method, that is, a connection structure in which electronic components are anisotropically conductively connected by using the anisotropic conductive film of an embodiment of the present invention.

An example of a method of connecting electronic components by using the anisotropic conductive film may be as follows. When the anisotropic conductive film is formed from a single layer of conductive particle-dispersed layer 3, the anisotropic conductive film is temporarily pressure-bonded to a second electronic component, such as any of a variety of substrates, from the side to which the conductive particles 1 are embedded in the surface, and a first electronic component, such as an IC chip, is mounted to the side in which the conductive particles 1 are not embedded in the surface of the temporarily pressure-bonded anisotropic conductive film, and this is subjected to thermocompression bonding. In this manner, the production can be performed. When the insulating resin layer of the anisotropic conductive film contains a photopolymerization initiator and a photopolymerizable compound (which may be identical to a thermo-polymerizable compound) in addition to a thermal polymerization initiator and the thermo-polymerizable compound, a pressure bonding method using a combination of light and heat may be employed. By this, the undesired transfer of the conductive particles can be suppressed to be minimized. Furthermore, the side to which the conductive particles are not embedded may be temporarily bonded to the second electronic component and used. Note that the anisotropic conductive film can be temporarily bonded to the first electronic component, not to the second electronic component.

Furthermore, when the anisotropic conductive film is formed from a layered body of the conductive particle-dispersed layer 3 and the second insulating resin layer 4, the conductive particle-dispersed layer 3 is temporarily pressure-bonded to a second electronic component, such as any of a variety of substrates, and a first electronic component, such as an IC chip, is aligned and mounted to the side of the second insulating resin layer 4 of the temporarily pressure-bonded anisotropic conductive film and thermocompression-bonded. The second insulating resin layer 4 side of the anisotropic conductive film may be temporarily bonded to the first electronic component. Furthermore, the side of the conductive particle-dispersed layer 3 can be temporarily bonded to the first electronic component and used.

EXAMPLES

Hereinafter, an anisotropic conductive film which is an aspect of the filler-containing film of the present invention is specifically described by using examples.

Examples 1 to 15 and Comparative Examples 1 to 3

(1) Production of Anisotropic Conductive Film

Resin compositions for forming an insulating resin layer, a second insulating resin layer, and a tack layer were each prepared according to the composition shown in Tables 1A and 1B.

The resin composition for forming the insulating resin layer was applied to a PET film with a film thickness of 50 μm using a bar coater, and this was dried in an oven at 80° C. for 5 minutes to form an insulating resin layer with the thickness shown in Tables 2A and 2B on the PET film. Similarly, the second insulating resin layer and the tack layer were each formed on the PET film with the thickness shown in Tables 2A (see FIG. 14) and 2B (see FIG. 15).

However, for Comparative Example 3, conductive particles were mixed into a resin composition for forming an insulating resin layer to form the insulating resin layer in which conductive particles were randomly dispersed in a single layer (number density: 70000 particles/mm$^2$).

TABLE 1A (unit: part by mass)

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Insulating resin layer | Phenoxy resin (YP-50; Nippon Steel & Sumikin Chemical Co., Ltd.) | 40 | 40 | 40 | 40 | 25 | 40 | 35 | 40 | 40 | 35 |
| | Silica filler (Aerosil R805; Nippon Aerosil Co., Ltd.) | 25 | 25 | 25 | 25 | 20 | 15 | 10 | 15 | 15 | 10 |
| | Liquid epoxy resin (jER828; Mitsubishi Chemical Corp.) | 30 | 30 | 30 | 30 | 15 | 40 | 15 | 40 | 40 | 15 |
| | Silane coupling agent (KBM-403; Shin-Etsu Chemical Co., Ltd.) | 2 | 2 | 2 | 2 | 2 | 2 | 2 | 2 | 2 | 2 |
| | Thermal cationic polymerization initiator (SI-60L; Sanshin Chemical Industry Co., Ltd.) | 3 | 3 | 3 | 3 | — | 3 | — | 3 | 3 | — |
| | Microcapsule-type latent curing agent (Novacure HX3941HP; Asahi Kasei E-materials Corp.) | — | — | — | — | 38 | — | 38 | — | — | 38 |
| Second insulating resin layer | Phenoxy resin (YP-50; Nippon Steel & Sumikin Chemical Co., Ltd.) | 40 | 40 | 40 | 40 | 30 | — | — | — | — | — |
| | Silica filler (Aerosil R805; Nippon Aerosil Co., Ltd.) | 5 | 5 | 5 | 5 | 5 | — | — | — | — | — |
| | Liquid epoxy resin (jER828; Mitsubishi Chemical Corp.) | 50 | 50 | 50 | 50 | 25 | — | — | — | — | — |
| | Silane coupling agent (KBM-403; Shin-Etsu Chemical Co., Ltd.) | 2 | 2 | 2 | 2 | 2 | — | — | — | — | — |
| | Thermal cationic polymerization initiator (SI-60L; Sanshin Chemical Industry Co., Ltd.) | 3 | 3 | 3 | 3 | — | — | — | — | — | — |
| | Microcapsule-type latent curing agent (Novacure HX3941HP; Asahi Kasei E-materials Corp.) | — | — | — | — | 38 | — | — | — | — | — |
| Tack layer | Phenoxy resin (YP-50; Nippon Steel & Sumikin Chemical Co., Ltd.) | — | — | — | — | — | — | — | — | — | — |
| | Silica filler (Aerosil R805; Nippon Aerosil Co., Ltd.) | — | — | — | — | — | — | — | — | — | — |
| | Liquid epoxy resin (jER828; Mitsubishi Chemical Corp.) | — | — | — | — | — | — | — | — | — | — |
| | Silane coupling agent (KBM-403; Shin-Etsu Chemical Co., Ltd.) | — | — | — | — | — | — | — | — | — | — |

TABLE 1A-continued (unit: part by mass)

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Thermal cationic polymerization initiator (SI-60L; Sanshin Chemical Industry Co., Ltd.) | — | — | — | — | — | — | — | — | — | — |
| Microcapsule-type latent curing agent (Novacure HX3941HP; Asahi Kasei E-materials Corp.) | — | — | — | — | — | — | — | — | — | — |

TABLE 1B (unit: part by mass)

| | | Example 11 | Example 12 | Example 13 | Example 14 | Example 15 | Comparative Example 1 | Comparative Example 2 | Comparative Example 3 |
|---|---|---|---|---|---|---|---|---|---|
| Insulating resin layer | Phenoxy resin (YP-50; Nippon Steel & Sumikin Chemical Co., Ltd.) | 40 | 35 | 40 | 40 | 40 | 40 | 40 | 40 |
| | Silica filler (Aerosil R805; Nippon Aerosil Co., Ltd.) | 10 | 30 | 25 | 15 | 25 | 25 | 15 | 25 |
| | Liquid epoxy resin (jER828; Mitsubishi Chemical Corp.) | 45 | 30 | 30 | 40 | 30 | 30 | 40 | 30 |
| | Silane coupling agent (KBM-403; Shin-Etsu Chemical Co., Ltd.) | 2 | 2 | 2 | 2 | 2 | 2 | 2 | 2 |
| | Thermal cationic polymerization initiator (SI-60L; Sanshin Chemical Industry Co., Ltd.) | 3 | 3 | 3 | 3 | 3 | 3 | 3 | 3 |
| | Microcapsule-type latent curing agent (Novacure HX3941HP; Asahi Kasei E-materials Corp.) | — | — | — | — | — | — | — | — |
| Second insulating resin layer | Phenoxy resin (YP-50; Nippon Steel & Sumikin Chemical Co., Ltd.) | 40 | 40 | 40 | — | 40 | 40 | — | 40 |
| | Silica filler (Aerosil R805; Nippon Aerosil Co., Ltd.) | 5 | 5 | 5 | — | 5 | 5 | — | 5 |
| | Liquid epoxy resin (jER828; Mitsubishi Chemical Corp.) | 50 | 50 | 50 | — | 50 | 50 | — | 50 |
| | Silane coupling agent (KBM-403; Shin-Etsu Chemical Co., Ltd.) | 2 | 2 | 2 | — | 2 | 2 | — | 2 |
| | Thermal cationic polymerization initiator (SI-60L; Sanshin Chemical Industry Co., Ltd.) | 3 | 3 | 3 | — | 3 | 3 | — | 3 |
| | Microcapsule-type latent curing agent (Novacure HX3941HP; Asahi Kasei E-materials Corp.) | — | — | — | — | — | — | — | — |
| Tack layer | Phenoxy resin (YP-50; Nippon Steel & Sumikin Chemical Co., Ltd.) | — | — | — | — | 37 | — | — | — |
| | Silica filler (Aerosil R805; Nippon Aerosil Co., Ltd.) | — | — | — | — | 8 | — | — | — |
| | Liquid epoxy resin (jER828; Mitsubishi Chemical Corp.) | — | — | — | — | 50 | — | — | — |
| | Silane coupling agent (KBM-403; Shin-Etsu Chemical Co., Ltd.) | — | — | — | — | 2 | — | — | — |
| | Thermal cationic polymerization initiator (SI-60L; Sanshin Chemical Industry Co., Ltd.) | — | — | — | — | 3 | — | — | — |
| | Microcapsule-type latent curing agent (Novacure HX3941HP; Asahi Kasei E-materials Corp.) | — | — | — | — | — | — | — | — |

Meanwhile, a mold was produced so that the distance between particles in the square lattice arrangement shown in FIG. 1A in the planar view of the conductive particles 1 became equal to the particle diameter of the conductive particle, and that the number density of the conductive particles became 28000 particles/mm$^2$. That is, a mold having the convex portion pattern of a square lattice arrangement, the convex portion pitch in the lattice axis being twice the average conductive particle diameter (3 μm), and an angle θ which was formed by the lattice axis and the short-side direction of the anisotropic conductive film being 15°, was produced, publicly known transparent resin pellets were poured into the mold while the transparent resin pellets were melted, and the melted transparent resin was cooled and allowed to harden to form a resin mold having the arrangement pattern of the concavity illustrated in FIG. 1A.

Particles in which, in accordance with JP 2014-132567 A, insulating microparticles (average particle diameter: 0.3 μm) were attached to surfaces of metal-coated resin particles (AUL703, Sekisui Chemical Co,. Ltd.; average particle diameter: 3 μm) were prepared as conductive particles, and these conductive particles were filled into concavities of the resin mold. This was covered with the insulating resin layer described above and pressed at 60° C. and at 0.5 MPa to achieve bonding. The insulating resin layer was then peeled from the mold, and the conductive particles on the insulating resin layer were pressurized (pressing conditions: 60 to 70° C., 0.5 MPa) to push the conductive particles into the insulating resin layer, thereby producing an anisotropic conductive film formed from a single layer of the conductive particle-dispersed layer (Examples 6 to 10 and 14 and Comparative Example 2). The embedded state of the conductive particles was controlled by the pressing conditions.

Furthermore, an anisotropic conductive film having two layers was produced by laminating a second insulating resin layer on the conductive particle-dispersed layer produced in the same manner (Examples 1 to 5 and 11 to 13 and Comparative Example 1). Furthermore, for Comparative Example 3, a second insulating resin layer was laminated on the insulating resin layer in which the conductive particles were dispersed as described above. In this case, the surface of the conductive particle-dispersed layer on which the second insulating resin layer was laminated was the surface of the insulating resin layer into which the conductive particles were pushed as shown in Table 2 or the surface on the opposite side.

Furthermore, an anisotropic conductive film having three layers was produced by laminating a tack layer on the anisotropic conductive film having two layers produced in the same manner (Example 15).

(2) Embedded State

Figure 12A:
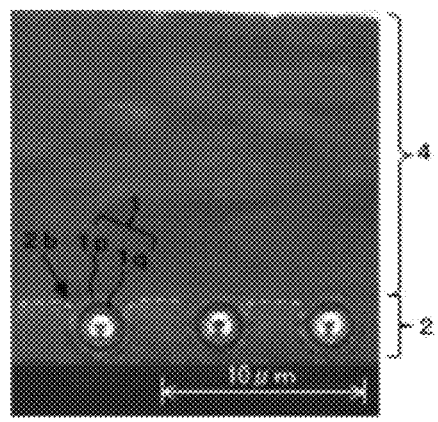
FIG. 12A is a cross-sectional photograph of an anisotropic conductive film of an example, which is an embodiment of the filler-containing film of the present invention.
Figure 12B:
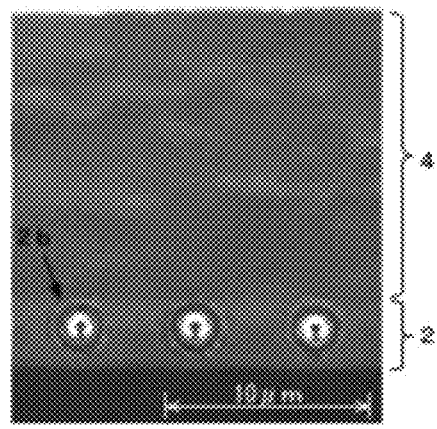
FIG. 12B is a cross-sectional photograph of an anisotropic conductive film of an example, which is an embodiment of the filler-containing film of the present invention.
Figure 12C:
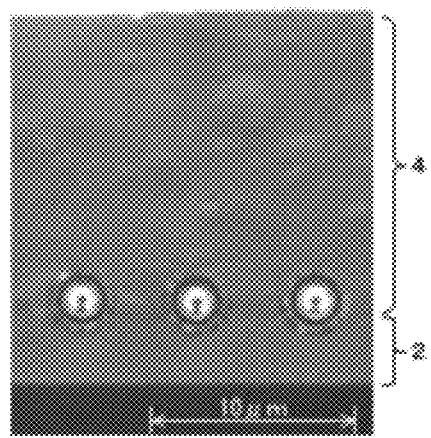
FIG. 12C is a cross-sectional photograph of an anisotropic conductive film, which is a comparative example of the filler-containing film of the present invention.
Figure 13A:
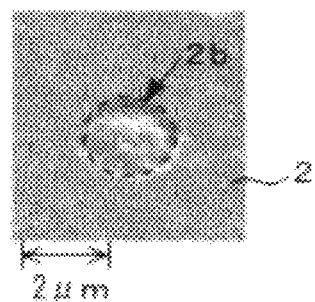
FIG. 13A is a photograph of a top face of an anisotropic conductive film of an example, which is an embodiment of the filler-containing film of the present invention.
Figure 13B:
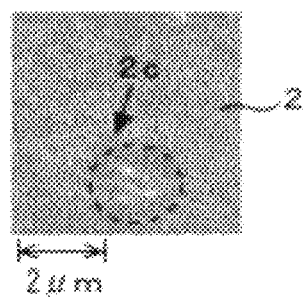
FIG. 13B is a photograph of a top face of an anisotropic conductive film of an example, which is an embodiment of the filler-containing film of the present invention.

The anisotropic conductive films of each of Examples 1 to 15 and Comparative Examples 1 to 3 were cut along a cutting-plane line that passes through a conductive particle, and the cross section thereof was observed by using a metallurgical microscope. Furthermore, for Examples 4 to 10 and 14 and Comparative Example 2, in which the conductive particles were exposed on the surface of the anisotropic conductive film or were in the vicinity of the film surface of the anisotropic conductive film, the film surface was observed by using a metallurgical microscope. FIG. 12A is a cross-sectional photograph of Example 2. FIG. 12B is a cross-sectional photograph of Example 3. FIG. 12C is a cross-sectional photograph of Comparative Example 3. FIG. 13A is a photograph of a top face of Example 4. FIG. 13B is a photograph of a top face of Example 8.

In Examples 1 to 7 and 9 to 15 and Comparative Example 1, both of the conductive particles with the embedding percentage of less than 60% and the conductive particles with the embedding percentage of greater than 100% were exposed from the insulating resin layer, and for Examples 1 to 7 and 9 to 15 among these, the concavities 2b were observed around the conductive particles on the surface of the insulating resin layer (FIGS. 12A, 12B, and 13A). The embedding percentage of Comparative Example 3 was less than 100%; however, the conductive particles were not exposed from the insulating resin layer, and the concavities 2b and 2c were not observed. Note that, in the photographs of FIGS. 12A, 12B, and 12C, the metal layer 1p of the conductive particle 1 is imaged as a circle with a deep color, and the insulating particle layer 1q attached to the metal layer 1p is imaged with a light color.

In Example 8, the conductive particles were completely embedded in the insulating resin layer, and the conductive particles were not exposed from the insulating resin layer; however, the concavities 2c were observed on the insulating resin layer surface directly above the conductive particle layer (FIG. 13B). In Comparative Example 2, the embedding percentage was slightly greater than 100% and the conductive particles were not exposed from the resin layer; and the surface of the resin layer was flat, and no concavities were observed on the surface of the resin layer directly above the conductive particles.

(3) Evaluation

For the anisotropic conductive film of the examples and the comparative examples produced in (1), (a) initial conduction resistance, (b) conduction reliability, (c) particle capturing performance, and (d) displacement were measured or evaluated as described below. Results are shown in Tables 2A and 2B.

(a) Initial Conduction Resistance

The anisotropic conductive film of each of the examples and the comparative examples was cut to a size sufficient for connection, sandwiched between an IC for a conduction property evaluation and a glass substrate, and heated and pressurized (180° C., 60 MPa, 5 seconds) so as to obtain each connected object for the evaluation. The conduction resistance of the obtained connected object for the evaluation was measured by a four-terminal method. The initial conduction resistance is practically preferably 2Ω or less, and more preferably 0.6Ω or less.

Here, the terminal patterns of the IC for the evaluation and the glass substrate corresponded to each other, and sizes thereof were as described below. In addition, when connecting the IC for evaluation and the glass substrate, the long-side direction of the anisotropic conductive film and the short-side direction of the bumps were aligned.

IC for Conduction Property Evaluation
  Outer shape: 1.8×20.0 mm
  Thickness: 0.5 mm
  Bump specifications: size: 30×85 µm; distance between bumps: 50 µm; bump height: 15 µm
Glass Substrate (ITO Wiring)
  Glass material: 1737F, available from Corning Inc.
  Outer shape: 30×50 mm
  Thickness: 0.5 mm
  Electrode: ITO wiring (b) Conduction Reliability The conduction resistance of the connected object for the evaluation produced in (a) was measured in the same manner as that for the initial conduction resistance, after the structures were placed in a thermostatic chamber at a temperature of 85° C. and a humidity of 85% RH for 500 hours. The conduction reliability is practically preferably 6Ω or less, and more preferably 4Ω or less.

(c) Particle Capturing Capability

The IC for a particle capturing performance evaluation, and a glass substrate having a terminal pattern corresponding to this IC for the evaluation (ITO wiring) were heated and pressurized (180° C., 60 MPa, 5 seconds) while the alignment was moved by 6 µm. For 100 particles in a 6 µm×66.6 µm area where the bumps of the IC for the evaluation and the terminals of the substrate were overlapped, the number of captured conductive particles was measured to determine the minimum number of capture. An evaluation was performed based on the following criteria. Practically, an evaluation result of B or higher is preferable.

IC for Particle Capturing Performance Evaluation
  Outer shape: 1.6×29.8 mm
  Thickness: 0.3 mm
  Bump specifications: size: 12×66.6 µm; bump pitch: 22 µm (L/S=12 µm/10 µm); bump height: 12 µm
Particle Capturing Performance Evaluation Criteria
  A: 5 particles or greater
  B: 3 particles or greater but less than 5 particles
  C: less than 3 particles (d) Displacement The IC for the evaluation that was the same as in (c), and a glass substrate having a terminal pattern corresponding to this IC for the evaluation (ITO wiring) were heated and pressurized (180° C., 60 MPa, 5 seconds) while the positions were matched. In this case, the particle pitch before the heating and pressurizing, and the particle pitch after the heating and pressurizing were each measured by using a metallurgical microscope (measured based on indentation observation from the glass side), and each average was determined. The particle gap was calculated based on the following equation and evaluated based on the following criteria. Practically, an evaluation result of C or higher is preferable.

Note that the evaluation of displacement for Comparative Example 3 was not performed because the conductive particles were randomly dispersed.

Particle gap=100*$P1/P0$ (in the equation, P1: average particle pitch after heating and pressurizing;

P0: average particle pitch before heating and pressurizing)

Displacement Evaluation Criteria

A: particle gap was 160% or less

B: particle gap was greater than 160% but 180% or less

C: particle gap was greater than 180% but 200% or less

D: particle gap was greater than 200%

From Tables 2A and 2B, Examples 1 to 3, in which the embedding percentage of the conductive particles was in the range of 60 to 105%, the conductive particles were protruded from the insulating resin layer, and the concavities 2b were present; and Example 8, in which the conductive particles were completely embedded in the insulating resin layer and the concavities 2c were present, achieved sufficiently low initial conduction resistance and excellent evaluation results for conduction reliability, particle capturing performance and displacement. However, Comparative Example 1, in which the embedding percentage was within the aforementioned range and the conductive particles were protruded from the insulating resin layer but the concavities 2b were absent, and Comparative Example 2, in which the conductive particles were completely embedded in the insulating resin layer but the concavities 2c were absent, had the evaluation result of D for the displacement, could not retain the conductive particles during the connection, and could not accommodate a fine pitch connection. Furthermore, it was found that Comparative Example 3, in which the conductive particles 1 were covered by the insulating resin layer 2 and protruded from the tangent plane to the central portion of the surface of the insulating resin layer 2 between adjacent conductive particles, but neither concavities 2b nor concavities 2c were present in the vicinity of the conductive particles 1, resulted in poor conduction reliability. From these, it is surmised that the conductive particles are easily affected by the resin flow at the time of an anisotropically conductive connection when the surface of the insulating resin layer 2 is protruded along the shape of the conductive particle 1, and it is not possible to sufficiently push the conductive particles into the terminals.

Furthermore, Examples 1 to 3 and 8 described above had the minimum melt viscosity of the insulating resin layer of 2000 Pa·s or greater and the melt viscosity at 60° C. of 3000 Pa·s or greater; however, Comparative Examples 1 and 2 had the minimum melt viscosity of 1000 Pa·s and the melt viscosity at 60° C. of 1500 Pa·s. In Comparative Examples 1 and 2, it was found that the concavities 2b and 2c were not formed because the viscosity at the time of pushing was low due to the adjustment of the pushing condition of the conductive particles. On the other hand, although Comparative Example 3 had the same degree of the minimum melt viscosity and the viscosity at 60° C. as those of Examples 1 to 3, no concavities 2b and 2c were formed because the conductive particles were dispersed in the resin composition for forming the insulating resin layer and were coated to form the conductive particle-dispersed layer, and because the conductive particle-dispersed layer was not formed by pushing the conductive particles into the insulating resin layer.

Furthermore, in the case where the concavities 2b were formed around the conductive particles, compared to Example 3 (minimum melt viscosity: 6000 Pa·S; melt viscosity at 60° C.: 8000 Pa·s), even when these viscosities were low like Example 11 (minimum melt viscosity: 2000 Pa·s; melt viscosity at 60° C.: 3000 Pa·s) or even when these viscosities were high like Example 12 (minimum melt viscosity: 10000 Pa·s; melt viscosity at 60° C.: 15000 Pa·s), the evaluation result in the displacement was B or higher without any practical problems.

Furthermore, Examples 1 to 3 and 8 described above had the embedding percentage of the conductive particles in the range of 60 to 105%; however, Example 13 having the embedding percentage of less than 60%, which was lower than the aforementioned range, gave an inferior evaluation result to those of Examples 1 to 3 and 8.

From Examples 4 and 5 and Examples 6 and 7, it was found that the evaluation results for the particle capturing performance and the displacement were practically excellent both in the case where the anisotropic conductive film was a two-layered type formed from the conductive particle-dispersed layer and the second insulating resin layer; and in the case where the anisotropic conductive film was a single layer of the conductive particle-dispersed layer. Furthermore, from Examples 2, 3, 13, and 15, it was found that the particle capturing performance was practically excellent even in the case of a three-layered type formed by providing the tack layer in addition to the two-layered type anisotropic conductive film.

From Example 3 and Examples 4 and 5, when the anisotropic conductive film was a two-layered type formed from the conductive particle-dispersed layer and the second insulating resin layer, it was found that the evaluation results for the capturing performance and the displacement were practically excellent both in the case where the second insulating resin layer was laminated on the face, having the conductive particles pushed therein, of the insulating resin layer; and in the case where the second insulating resin layer was laminated on the face located on the opposite side.

Furthermore, from Examples 6, 7, 9, 10, and 14, it was found that the evaluation result for the displacement was inferior when the ratio La/D of the layer thickness La of the insulating resin layer to the particle diameter D of the conductive particle was greater than 10, compared to the case where the ratio La/D was 10 or less.

Note that similar evaluations were performed for samples obtained by spraying a diluted resin composition of the same resin composition to the surfaces of the anisotropic conductive films of Examples 4 and 5, where the conductive particles were exposed, and by making the surface thereof substantially flat, and substantially the same results were obtained.

Furthermore, for the connected object for evaluating the initial conduction resistance of each of all examples, the number of short circuit at 100 spaces between bumps was determined in the same manner as the measurement method of the number of short circuit described in examples of JP 2016-085983 A, and no short circuit was found. Furthermore, for the anisotropic conductive film of each of all examples, a short occurrence rate was determined in accordance with the measurement method of the short occurrence rate described in examples of JP 2016-085982 A, and it was confirmed that all the results were less than 50 ppm and practically had no problems.

Experimental Examples 1 to 4

Production of Anisotropic Conductive Film

For an anisotropic conductive film to be used in a COG connection, resin compositions for forming an insulating resin layer and a second insulating resin layer were prepared according to the composition shown in Table 3 to investigate the effects of the resin composition of the insulating resin layer on film forming capacity and conduction properties. In this case, the minimum melt viscosity of the resin composition was adjusted by the preparation conditions of the resin composition. An insulating resin layer was formed in the same manner as in Example 1 by using the obtained resin composition, and conductive particles were pushed into this insulating resin layer to prepare an anisotropic conductive film formed from a single layer of a conductive particle-dispersed layer, and then a second insulating resin layer was further laminated on the side of the insulating resin layer into which the conductive particles were pushed, to produce an anisotropic conductive film shown in Table 4. In this case, the disposition of the conductive particles was the same as the disposition in Example 1. Furthermore, by appropriately adjusting the pushing condition of the conductive particles, the conductive particles were in the embedded state shown in Table 4.

In the production process of this anisotropic conductive film, the film shape was not maintained in Experimental Example 4 after the conductive particles were pushed into the insulating resin layer (film shape evaluation: NG), but the film shape was maintained in the other experimental examples (film shape evaluation: OK). Therefore, the embedded state of the conductive particles was observed and measured with a metallurgical microscope for the anisotropic conductive films of the experimental examples excluding Experimental Example 4, and the following evaluation was further performed.

Note that, in each of the experimental examples except Experimental Example 4, the concavities around conductive particles exposed from the insulating resin layer, the concavities of the insulating resin layer directly above the conductive particles, or both of these were observed. In Table 4, a measured value for the case where the concavity was most clearly observed was shown for each experimental example. The observed embedded state satisfied the preferable ranges described above.

TABLE 3

|  |  | (Part by mass) | | | |
|---|---|---|---|---|---|
|  |  | Composition | | | |
|  |  | A | B | C | D |
| Insulating resin layer | Phenoxy resin (YP-50; Nippon Steel & Sumikin Chemical Co., Ltd.) | 50 | 45 | 40 | 37 |
|  | Silica filler (Aerosil R805, Aerosil Japan) | 20 | 10 | 10 | 8 |
|  | Liquid epoxy resin (jER828, Mitsubishi Chemical Corporation) | 25 | 40 | 45 | 50 |
|  | Silane coupling agent (KBM-403, Shin-Etsu Co., Chemical Ltd.) | 2 | 2 | 2 | 2 |
|  | Thermal cationic polymerization initiator (SI-60L, Sanshin Chemical Industry Co., Ltd.) | 3 | 3 | 3 | 3 |
| Second insulating resin layer | Phenoxy resin (YP-50; Nippon Steel & Sumikin Chemical Co., Ltd.) | 40 | | | |
|  | Silica filler (Aerosil R805, Aerosil Japan) | 5 | | | |
|  | Liquid epoxy resin (jER828, Mitsubishi Chemical Corporation) | 50 | | | |
|  | Silane coupling agent (KBM-403; Shin-Etsu Chemical Co., Ltd.) | 2 | | | |
|  | Thermal cationic polymerization initiator (SI-60L, Sanshin Chemical Industry Co., Ltd.) | 3 | | | |

TABLE 4

|  |  | Experimental Example 1 | Experimental Example 2 | Experimental Example 3 | Experimental Example 4 |
|---|---|---|---|---|---|
| Composition of resin composition (Table 3) | | A | B | C | D |
| Film shape after pushing of conductive particles | | OK | OK | OK | NG |
| Conductive particle diameter: D ($\mu$m) | | 3 | 3 | 3 | 3 |
| Disposition of conductive particles | | Square lattice | Square lattice | Square lattice | Square lattice |
| Center distance of closest conductive particles ($\mu$m) | | 6 | 6 | 6 | 6 |
| Thickness ($\mu$m) | Insulating resin layer (La) | 4 | 4 | 4 | 4 |
|  | Second insulating resin layer | 14 | 14 | 14 | 14 |
|  | La/D | 1.3 | 1.3 | 1.3 | 1.3 |
| Minimum melt viscosity (Pa·s) | Insulating resin layer | 8000 | 2000 | 1500 | 800 |
|  | Second insulating resin layer | 800 | 800 | 800 | 800 |
|  | Total melt viscosity | 1200 | 900 | 900 | 800 |
| Viscosity at 60° C. (Pa·s) | Insulating resin layer | 12000 | 3000 | 2000 | 1100 |

TABLE 4-continued

| | Experimental Example 1 | Experimental Example 2 | Experimental Example 3 | Experimental Example 4 |
|---|---|---|---|---|
| Embedded state of conductive particles | | | | |
| Embedding rate (100 × Lb/D) % | >80 | >95 | >95 | — |
| Exposed diameter Lc (μm) | <2.8 | <2.5 | <2.5 | — |
| Presence or absence of concavities | Present | Present | Present | — |
| Maximum depth Le of concavities (Ratio with respect to conductive particle diameter D) | <50% | <50% | <50% | — |
| Maximum diameter Ld of concavities (Ratio with respect to conductive particle diameter D) | <1.3 | <1.3 | <1.3 | — |
| Evaluation | | | | |
| Initial conduction resistance | OK | OK | OK | — |
| Conduction reliability | OK | OK | OK | — |

Evaluation (a) Initial Conduction Resistance and Conduction Reliability

In the same manner as in Example 1, the initial conduction resistance and the conduction reliability were evaluated. The evaluation criteria of this case are as shown below. Results are shown in Table 4.

Initial Conduction Resistance Evaluation Criteria
OK: 2.0Ω or less
NG: greater than 2.0Ω

Conduction Reliability Evaluation Criteria
OK: 6.0Ω or less
NG: greater than 6.0Ω

(b) Particle Capturing Performance

In the same manner as in Example 1, the particle capturing performance was evaluated.

As a result, all of Examples 1 to 3 were evaluated as B or higher.

(c) Short Occurrence Rate

The short occurrence rate was evaluated in the same manner as in Example 1.

As a result, it was confirmed that all of Examples 1 to 3 were less than 50 ppm and had practically no problems.

From Table 4, it was found that, when the minimum melt viscosity of the insulating resin layer was 800 Pa·s, it was difficult to form a film having concavities in the insulating resin layer in the vicinity of the conductive particles. On the other hand, it was found that, when the minimum melt viscosity of the insulating resin layer was 1500 Pa·s or greater, concavities can be formed in the vicinity of the conductive particles on the surface of the insulating resin layer by adjusting the conditions at the time of the embedding of the conductive particles, and that the resulting anisotropic conductive film has good conduction properties for COG. Note that, for all of Experimental Examples 1 to 3, the initial conduction resistance was 0.6Ω or less, the conduction reliability was 4Ω or less, and thus excellent results were achieved.

Experimental Examples 5 to 8

Production of Anisotropic Conductive Film

For an anisotropic conductive film to be used in FOG connection, resin compositions for forming an insulating resin layer and a second insulating resin layer were prepared according to the composition shown in Table 5 to investigate the effects of the resin composition of the insulating resin layer on film forming capacity and conduction properties. In this case, the disposition of the conductive particles was a hexagonal lattice arrangement with the number density of 15000 particles/mm², and one lattice axis thereof was inclined by 15° with respect to the long-side direction of the anisotropic conductive film. Furthermore, the minimum melt viscosity of the resin composition was adjusted by preparation conditions of the resin composition. An insulating resin layer was formed in the same manner as in Example 1 by using the obtained resin composition, and conductive particles were pushed into this insulating resin layer to prepare an anisotropic conductive film formed from a single layer of a conductive particle-dispersed layer, and then a second insulating resin layer was further laminated on the side of the insulating resin layer into which the conductive particles were pushed, to produce an anisotropic conductive film shown in Table 6. In this case, by appropriately adjusting the pushing condition of the conductive particles, the conductive particles were in the embedded state shown in Table 6.

In the production process of this anisotropic conductive film, the film shape was not maintained in Experimental Example 8 after the conductive particles were pushed into the insulating resin layer (film shape evaluation: NG), but the film shape was maintained in the other experimental examples (film shape evaluation: OK). Therefore, the embedded state of the conductive particles was observed and measured with a metallurgical microscope for anisotropic conductive films of the experimental examples excluding Experimental Example 8, and the following evaluation was further performed.

Note that, in each of the experimental examples except Experimental Example 8, the concavities around conductive particles exposed from the insulating resin layer, the concavities of the insulating resin layer directly above the conductive particles, or both of these were observed. In Table 6, a measured value for the case where the concavity was most clearly observed was shown for each experimental example. The observed embedded state satisfied the preferable ranges described above.

TABLE 5

| | | (Part by mass) Composition | | | |
|---|---|---|---|---|---|
| | | E | F | G | H |
| Insulating resin layer | Phenoxy resin (YP-50; Nippon Steel & Sumikin Chemical Co., Ltd.) | 55 | 45 | 25 | 5 |
| | Phenoxy resin (FX-316ATM55, Nippon Steel & Sumikin Chemical Co., Ltd.) | | | 20 | 40 |
| | Bifunctional acrylate (A-DCP; Shin-Nakamura Chemical Co., Ltd.) | 20 | 20 | 20 | 20 |
| | Bifunctional urethane acrylate oligomer (UN-9200A, Negami Chemical Industrial Co., Ltd.) | 25 | 35 | 35 | 35 |
| | Silane coupling agent (A-187, Momentive Performance Materials Inc.) | 1 | 1 | 1 | 1 |
| | Phosphoric acid methacrylate (KAYAMER PM-2, Nippon Kayaku Co., Ltd.) | 1 | 1 | 1 | 1 |
| | Benzoyl peroxide (Nyper BW, NOF Corporation) | 5 | 5 | 5 | 5 |

TABLE 5-continued

| | | (Part by mass) Composition | | | |
|---|---|---|---|---|---|
| | | E | F | G | H |
| Second insulating resin layer | Phenoxy resin (FX-316ATM55, Nippon Steel & Sumikin Chemical Co., Ltd.) | | 50 | | |
| | Bifunctional acrylate (A-DCP; Shin-Nakamura Chemical Co., Ltd.) | | 20 | | |
| | Bifunctional urethane acrylate oligomer (UN-9200A, NegamiChemical Industrial Co., Ltd.) | | 30 | | |
| | Silane coupling agent (A-187, Momentive Performance Materials Inc.) | | 1 | | |
| | Phosphoric acid methacrylate (KAYAMER PM-2, Nippon Kayaku Co., Ltd.) | | 1 | | |
| | Benzoyl peroxide (Nyper BW, NOF Corporation) | | 5 | | |

TABLE 6

| | | Experimental Example 5 | Experimental Example 6 | Experimental Example 7 | Experimental Example 8 |
|---|---|---|---|---|---|
| Composition of resin composition (Table 5) | | E | F | G | H |
| Film shape after pushing of conductive particles | | OK | OK | OK | NG |
| Conductive particle diameter: D (μm) | | 3 | 3 | 3 | 3 |
| Disposition of conductive particles | | Hexagonal lattice | Hexagonal lattice | Hexagonal lattice | Hexagonal lattice |
| Center distance of closest conductive particles (μm) | | 9 | 9 | 9 | 9 |
| Thickness (μm) | Insulating resin layer (La) | 4 | 4 | 4 | 4 |
| | Second insulating resin layer | 14 | 14 | 14 | 14 |
| | La/D | 1.3 | 1.3 | 1.3 | 1.3 |
| Minimum melt viscosity (Pa·s) | Insulating resin layer | 8000 | 2000 | 1500 | 800 |
| | Second insulating resin layer | 800 | 800 | 800 | 800 |
| | Total melt viscosity | 1200 | 900 | 900 | 800 |
| Viscosity at 60° C. (Pa·s) | Insulating resin layer | 12000 | 3000 | 2000 | 1100 |
| Embedded state of conductive particles | | | | | |
| Embedding rate (100 × Lb/D) % | | >80 | >95 | >95 | — |
| Exposed diameter Lc (μm) | | <2.8 | <2.5 | <2.5 | — |
| Presence or absence of concavities | | Present | Present | Present | — |
| Maximum depth Le of concavities (Ratio with respect to conductive particle diameter D) | | <50% | <50% | <50% | — |
| Maximum diameter Ld of concavities (Ratio with respect to conductive particle diameter D) | | <1.3 | <1.3 | <1.3 | — |
| Evaluation | | | | | |
| Initial conduction resistance | | OK | OK | OK | — |
| Conduction reliability | | OK | OK | OK | — |

Evaluation (a) Initial Conduction Resistance and Conduction Reliability (i) The initial conduction resistance and (ii) the conduction reliability were evaluated as follows. Results are shown in Table 6.

(i) Initial Conduction Resistance

The anisotropic conductive film obtained in each experimental example was cut into an area that was sufficient for the connection, sandwiched between a non-alkali glass substrate and an FPC for a conduction property evaluation, and heated and pressed (180° C., 4.5 MPa, 5 seconds) with a tool width of 1.5 mm of the thermocompression bonding tool to obtain a connected object for the evaluation. The conduction resistance of the obtained connected object for the evaluation was measured by the four-terminal method, and the measured value was evaluated based on the following criteria.

FPC for Conduction Property Evaluation
 Terminal pitch: 20
 Terminal width/space between terminals: 8.5 μm/11.5 μm
 Polyimide film thickness (PI)/copper foil thickness (Cu)= 38/8, Sn plating Non-Alkali Glass Substrate
 Electrode: ITO wiring
 Thickness: 0.7 mm Initial Conduction Resistance Evaluation Criteria
 OK: less than 2.0Ω
 NG: 2.0Ω or greater (ii) Conduction Reliability The connected object for the evaluation produced in (i) was placed in a thermostatic chamber for 500 hours at a temperature of 85° C. and a humidity of 85% RH, and then the conduction resistance was measured in the same manner as in the case of the initial conduction resistance. The measured value was evaluated based on the following criteria.

Conduction Reliability Evaluation Criteria
 OK: less than 5.0Ω
 NG: 5.0Ω or greater (b) Particle Capturing Performance For 100 terminals of the connected object for the evaluation prepared in (i), the number of captured conductive particles was measured, and the minimum number of capture was determined. If the minimum number of capture was 10 or greater, the connected object for the evaluation was evaluated as being suitable for practical use.

All of Experimental Examples 5 to 7 had the minimum number of capture of 10 or greater.

(c) Short Occurrence Rate

The number of shorts of the connected object for the evaluation prepared in (i) was counted, and the short occurrence rate was determined from the counted number of shorts and the number of gaps of the connected object for the evaluation. It was confirmed that all of Examples 5 to 7 had the short occurrence rate of less than 50 ppm and had practically no problems.

It can be seen from Table 6 that, when the minimum melt viscosity of the insulating resin layer was 800 Pa·s, it is difficult to form a film having concavities on the surface of the insulating resin layer in the vicinity of the conductive particles. On the other hand, it can be seen that, when the minimum melt viscosity of the insulating resin layer was 1500 Pa·s or greater, concavities can be formed in the vicinity of the conductive particles on the surface of the insulating resin layer by adjusting the conditions at the time of the embedding of the conductive particles, and that the resulting anisotropic conductive film has good conduction properties for FOG.

REFERENCE SIGNS LIST

1 Filler, Conductive particle
1a Filler apical part
1p Metal layer of conductive particle
1q Insulating particle layer
2 Resin layer
2a Surface of resin layer
2b Concavity
2c Concavity
2p Tangent plane
2q Protruded portion
3 Filler-dispersed layer, Conductive particle-dispersed layer
4 Second resin layer, Second insulating resin layer
10A, 10B, 10C, 10C', 10D, 10E, 10F, 10G, 10H, and 10I Filler-containing film, Anisotropic conductive film
20 Terminal
A Lattice axis
D Particle diameter of filler, Particle diameter of conductive particle
La Layer thickness of resin layer
Lb Embedded amount (distance of deepest part of filler from tangent plane to central portion of resin layer surface between adjacent fillers)
Lc Exposed diameter
Ld Maximum diameter of concavity
Le Maximum depth of concavity around exposed portion of filler
Lf Maximum depth of concavity in resin directly above filler
θ Angle formed by long-side direction of terminal and lattice axis of conductive particle arrangement

The invention claimed is:

1. A filler-containing film comprising:
a filler-dispersed layer having first fillers dispersed in a resin layer, a surface of the resin layer in a vicinity of the first filler having a concavity with respect to a tangent plane to a central portion of the resin layer surface between adjacent first fillers,
wherein the concavity is derived from plastic deformation of the resin layer occurred upon pushing the first fillers into the resin layer, and the concavity reduces an amount of resin directly above or around the first filler,
wherein the first fillers are regularly arranged on the surface of the resin layer,
wherein the resin layer has a melt viscosity of 1000 Pa·s to 15000 Pa·s,
wherein a ratio of a distance Lb of a deepest part of the first filler from the tangent plane to the central portion of the resin layer surface provided with the concavity between the adjacent first fillers to a particle diameter D of the first filler (Lb/D) is from 60% to 105%, and
wherein the resin layer further comprises second fillers that are insulating and different from the first fillers, are smaller than the first fillers, and have an average particle diameter of 20 to 1000 nm.

2. The filler-containing film according to claim 1, wherein the concavity is formed on the surface of the resin layer around the first filler exposed from the resin layer.

3. The filler-containing film according to claim 2, wherein a ratio of a depth Le of the concavity from the tangent plane to a particle diameter D of the first filler (Le/D) is less than 50%.

4. The filler-containing film according to claim 2, wherein a ratio of a maximum diameter Ld of the concavity to a particle diameter D of the first filler (Ld/D) is 100% or greater.

5. The filler-containing film according to claim 1, wherein the concavity is formed on the surface of the resin layer directly above the first filler not exposed from the resin layer and embedded in the resin layer.

6. The filler-containing film according to claim 5, wherein a ratio of a depth Lf of the concavity from the tangent plane to a particle diameter D of the first filler (Lf/D) is less than 10%.

7. The filler-containing film according to claim 1, wherein the first filler is in contact with the tangent plane to the central portion of the resin layer surface between the adjacent first fillers, and the concavity is formed on the surface of the resin layer around a contact point of the tangent plane and the first filler.

8. The filler-containing film according to claim 1, wherein the first fillers are arranged without contact with another first filler.

9. The filler-containing film according to claim 1, wherein a minimum interparticle spacing of the first fillers is not less than 0.5 times a particle diameter of the first filler.

10. The filler-containing film according to claim 1, wherein a second resin layer is laminated on a surface that is on the opposite side of the surface on which the concavity is formed in the resin layer of the filler-dispersed layer.

11. The filler-containing film according to claim 1, wherein a second resin layer is laminated on a surface on which the concavity is formed in the resin layer of the filler-dispersed layer.

12. The filler-containing film according to claim 1, wherein a viscosity at 60° C. of the resin layer of the filler-dispersed layer is from 3000 to 20000 Pa·s.

13. The filler-containing film according to claim 1, wherein the first filler is a conductive particle, and the resin layer of the filler-dispersed layer is an insulating resin layer.

14. The filler-containing film according to claim 13, wherein the filler-containing film is an anisotropic conductive film.

15. The filler-containing film according to claim 1, wherein a diameter of the concavity is smaller than a diameter of the first fillers.

16. The filler-containing film according to claim 1, wherein the resin layer contains a curable resin, and the filler-containing film is before curing reaction.

17. The filler-containing film according to claim 1, wherein the first fillers have an average particle diameter of 1 to 30 μm.

18. The filler-containing film according to claim 1, wherein the resin layer is formed from a curable resin composition containing a photopolymerizable compound and a photopolymerization initiator.

19. A film adhered body, comprising the filler-containing film according to claim 1 being adhered to an article.

20. A connection structure, comprising
a first article and a second article that are connected through the filler-containing film according to claim 1.

21. The connection structure according to claim 20, wherein:
the first article is a first electronic component,
the second article is a second electronic component,
the filler-containing film being a conductive film having conductive particles as first fillers,
the resin layer of the filler-dispersed layer is an insulating resin layer, and
the first electronic component and the second electronic component are conductively connected through the filler-containing film.

22. The connection structure according to claim 21, wherein the conductive film is an anisotropic conductive film, and the first electronic component and the second electronic component are anisotropically conductively connected through the filler-containing film.

23. A method of producing a connection structure, the method comprising pressure-bonding a first article and a second article through the filler-containing film according to claim 1.

24. The method of producing a connection structure according to claim 23, wherein the first article is a first electronic component and the second article is a second electronic component, the method comprising producing a connection structure in which the first electronic component and the second electronic component are conductively connected by thermocompression bonding the first electronic component and the second electronic component through the filler-containing film,
wherein the filler-containing film is an conductive film having conductive particles as first fillers, and the resin layer of the filler-dispersed layer is an insulating resin layer.

25. The method of producing a connection structure according to claim 24, wherein the first electronic component and the second electronic component are anisotropically conductively connected, and the conductive film is an anisotropic conductive film.

26. A method of producing the filler-containing film of claim 1, the method comprising a step of forming a filler-dispersed layer in which first fillers are dispersed in a resin layer, wherein the step of forming a filler-dispersed layer comprises:
a step of allowing the first fillers to be retained on a surface of the resin layer, and
a step of pushing the first fillers retained on the surface of the resin layer into the resin layer;
in the step of allowing the first fillers to be retained on a surface of the resin layer, the first fillers are retained on the surface of the resin layer under a condition that the first fillers are regularly arranged; and
in the step of pushing the first fillers into the resin layer, a viscosity of the resin layer, a pushing rate, or a temperature at which the first fillers are pushed into is adjusted such that under a condition that the surface of the resin layer in a vicinity of the first filler has a concavity with respect to a tangent plane to a central portion of the resin layer surface between adjacent first fillers.

27. The method of producing a filler-containing film according to claim 26, wherein, in the step of allowing the first fillers to be retained on a surface of the resin layer, the resin layer has a minimum melt viscosity of 1100 Pa·s or greater and a viscosity at 60° C. of 3000 Pa·s or greater.

28. The method of producing a filler-containing film according to claim 26, wherein in the step of allowing the first fillers to be retained on a surface of the resin layer, the first fillers are retained in a predetermined arrangement on the surface of the resin layer; and in the step of pushing the first fillers into the resin layer, the first fillers are pushed into the resin layer by a flat plate or a roller.

29. The method of producing a filler-containing film according to claim 26, wherein, in the step of allowing the first fillers to be retained on a surface of the resin layer, the first fillers are charged into a transfer mold, and the first fillers are retained on the surface of the resin layer in a predetermined arrangement by transferring the fillers to the resin layer.

30. The method of producing a filler-containing film according to claim 26, wherein the first fillers are conductive particles, and the resin layer of the filler-dispersed layer is an insulating resin layer.

31. The method of producing a filler-containing film according to claim 30, wherein the filler-containing film is an anisotropic conductive film.

32. The method according to claim 26, further comprising a step of laminating a second resin layer on the surface or a back surface of the resin layer on the side into which the first fillers are pushed.

33. The method according to claim 26, wherein as the resin layer, there is used one on which a second resin layer has been laminated.

* * * * *